(12) United States Patent  (10) Patent No.: US 8,948,143 B2
Gao et al.  (45) Date of Patent: Feb. 3, 2015

(54) SCRAMBLED TRANSMISSION METHOD AND DEVICE THEREOF

(75) Inventors: Xuejuan Gao, Beijing (CN); Zukang Shen, Beijing (CN); Yanan Lin, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 0 days.

(21) Appl. No.: 13/978,527

(22) PCT Filed: Jan. 6, 2012

(86) PCT No.: PCT/CN2012/070118
§ 371 (c)(1),
(2), (4) Date: Jul. 5, 2013

(87) PCT Pub. No.: WO2012/092879
PCT Pub. Date: Jul. 12, 2012

(65) Prior Publication Data
US 2013/0279485 A1  Oct. 24, 2013

(30) Foreign Application Priority Data
Jan. 6, 2011 (CN) .......................... 2011 1 0001898
Jan. 7, 2011 (CN) .......................... 2011 1 0002897

(51) Int. Cl.
*H04L 5/00* (2006.01)
*H04B 7/02* (2006.01)
(Continued)

(52) U.S. Cl.
CPC ........... *H04W 72/0446* (2013.01); *H04L 9/065* (2013.01); *H04L 9/0656* (2013.01); *H04L 25/03866* (2013.01); *H04L 27/2636* (2013.01);
(Continued)

(58) Field of Classification Search
USPC .................................. 370/203, 464, 474, 478
See application file for complete search history.

(56) References Cited

U.S. PATENT DOCUMENTS 7,366,200 B2 * 4/2008 Laroia et al. .................. 370/478
7,813,261 B2 * 10/2010 Ma et al. ....................... 370/203
(Continued)

FOREIGN PATENT DOCUMENTS

CN  101272232 A  9/2008
CN  101296021 A  10/2008
(Continued)

OTHER PUBLICATIONS

International Search Report mailed for PCT/CN2012/070118, mailed Apr. 12, 2012.
(Continued)

*Primary Examiner* — Andrew Lai
*Assistant Examiner* — John Lequang
(74) *Attorney, Agent, or Firm* — Collard & Roe, P.C.

(57) ABSTRACT

Disclosed are a scrambling transmission method and device thereof. The method comprises: a user terminal generates the message to be sent and modulates the message to be sent to generate the data modulation symbols; the user terminal scrambles the data modulation symbol using the cell-specific scrambling sequence, to generate the scrambled data modulation symbols; and the user terminal sending the scrambled data modulation symbols via a DFT-S-OFDM transmission structure with a time domain spreading. The present invention can reduce the interference among different user terminal data on the same resource in adjacent cells, thus improve the detection performance of uplink control signals.

20 Claims, 8 Drawing Sheets

(51) Int. Cl.
*H04W 72/04* (2009.01)
*H04L 9/06* (2006.01)
*H04L 25/03* (2006.01)
*H04L 27/26* (2006.01)
*H04J 11/00* (2006.01)
*H04K 1/00* (2006.01)

(52) U.S. Cl.
CPC ............... *H04J 11/005* (2013.01); *H04K 1/00* (2013.01); *H04L 5/0016* (2013.01); *H04L 5/0055* (2013.01); *H04L 2209/20* (2013.01)
USPC ........................... 370/336; 370/203; 370/478

(56) References Cited

U.S. PATENT DOCUMENTS

| | | | | |
|---|---|---|---|---|
| 8,300,651 | B1 * | 10/2012 | Pick et al. | 370/431 |
| 2004/0160892 | A1 * | 8/2004 | Agrawalla et al. | 370/203 |
| 2007/0081604 | A1 | 4/2007 | Khan et al. | |
| 2013/0279485 | A1 | 10/2013 | Gao et al. | |

FOREIGN PATENT DOCUMENTS

| | | | | |
|---|---|---|---|---|
| CN | 101330671 A | | 12/2008 | |
| CN | 102065054 A | | 5/2011 | |
| WO | WO-2011/039625 | * | 4/2011 | ................ H04L 9/08 |
| WO | WO-2011/087448 | * | 7/2011 | ................ H04L 5/00 |

OTHER PUBLICATIONS

Nternational Preliminary Report on Patentability and Written Opinion of the International Searching Authority for PCT/CN2012/070118, mailed Apr. 12, 2012.

Huawei et al., "Clarification of RNTI used in scarmbling sequence,"3GPP TSG-RAN-WG1 Meeting # 55bis R1-090109, Jan. 16, 2009, 52 pages (already part of file as it is mentioned in Search Report).

* cited by examiner

US 8,948,143 B2

SCRAMBLED TRANSMISSION METHOD AND DEVICE THEREOF

CROSS REFERENCE TO RELATED APPLICATIONS

This application is the National Stage of PCT/CN2012/070118 filed on Jan. 6, 2012, which claims priority under 35 U.S.C. §119 of Chinese Application No. 201110001898.0 filed on Jan. 6, 2011 and Chinese Application No. 201110002897.8 filed on Jan. 7, 2011, the disclosures of which are incorporated by reference. The international application under PCT article 21(2) was not published in English.

FIELD OF THE PRESENT INVENTION

The present invention relates to wireless communication technology, in particular to a scrambling transmission method and device thereof.

BACKGROUND OF THE PRESENT INVENTION

Currently LTE-A (Long Term Evolution-Advanced) system can support CA (Carrier Aggregation) of at most 5 carriers and a LTE-A UE (User Equipment, namely, user terminal) needs to submit ACK (ACKnowledgement)/NACK (Non-ACKnowledgement) feedback information of corresponding multiple downlink carriers and downlink subframes in the same uplink subframe. Therefore, LTE-A system defines a new kind of PUCCH (Physical Uplink Control Channel) format, namely, PUCCH format 3 to support transmission with comparatively large ACK/NACK feedback bit number.

PUCCH format 3 supports to feed back at most 20-bit ACK/NACK and its transmission structure is shown in FIG. 1. Firstly ACK/NACK feedback bits are encoded using RM (Reed-Muller) coding. In case the number of ACK/NACK feedback bits is not larger than 11 bits, RM (32, O)+repetition coding method in Rel-8 (Release-8, version 8) system is reused to encode ACK/NACK feedback bits into 48-bit coded bits. While in case the number of ACK/NACK feedback bits exceeds 11, Dual-RM coding method is used to divide ACK/NACK feedback bits into two groups equally, and RM (32, O)+truncation coding method is adopted for each group to encode ACK/NACK feedback bit in each group into 24-bit coded bits. The coded bits sequence after RM encoding will be scrambled at a bit-level and modulated and transmitted in 2 slots of an uplink subframe by spreading the modulated symbols into multiple SC-FDMA (Single Carrier-Frequency Division Multiple Access) symbols in a slot through a time domain OC (Orthogonal Cover) sequence with a SF (Spreading Factor) equal to 5, so as to achieve time domain diversity gain. For normal cyclic prefix (Normal CP), there are two columns of RS (Reference Signal, also called pilot frequency) in each slot and they occupy the second SC-FDMA symbol and the six one respectively, as shown in FIG. 1; for extended cyclic prefix (Extended CP), there is one column of RS, which occupies the fourth SC-FDMA, as shown in FIG. 2. The same information shall be transmitted in two slots using frequency hopping transmission, which means that each slot occupies one of the two marginal parts of frequency band respectively to enable, so as to achieve frequency domain diversity gain.

PUCCH format 3 also supports shortened format for transmitting SRS (Sounding Reference Signal) at the same time. In shortened format, the length of SF in the first slot is 5, that of SF in the second slot is 4, the last SC-FDMA symbol in the second slot is reserved for transmitting SRS and its structure is shown in FIG. 3. If UE is configured to support simultaneous transmission of ACK/NACK and SRS in the same uplink subframe, shortened PUCCH format 3 will be used to transmit multi-bit ACK/NACK together with SRS. Table 1 shows the OC sequences corresponding to different SF lengths and $N_{SF}^{PUCCH}$ therein represents SF length. Considering that the different data used different OC sequences to do time domain spreading are orthogonal with each other, thus, multiplexing transmission of multiple UEs in the same PRB (Physics Resource Block pair) pair can be supported by configuring different OC sequences for different UEs and at most 5 users can be multiplexed in a PRB pair.

TABLE 1

OC Sequence of PUCCH Format 3

| Sequence index $n_{oc}$ | Orthogonal sequence $[w_{n_{oc}}(0) \ldots w_{n_{oc}}(N_{SF}^{PUCCH} - 1)]$ | |
|---|---|---|
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

A base station informs a UE the PUCCH format 3 resource index $n_{PUCCH}^{(3)}$ used for ACK/NACK feedback via PUCCH format 3 through explicit signaling and UE will calculate the PRB number ($n_{PRB}$) and the OC sequence number ($n_{OC}$) for feeding back ACK/NACK message according to the PUCCH format 3 resource index, that is $$n_{PRB} = \begin{cases} \lfloor m/2 \rfloor & \text{if } (m + n_s \bmod 2) \bmod 2 = 0 \\ N_{RB}^{UL} - 1 - \lfloor m/2 \rfloor & \text{if } (m + n_s \bmod 2) \bmod 2 = 1 \end{cases} \quad [1]$$

Wherein, $N_{RB}^{UL}$ refers to uplink bandwidth (measured through PRB quantity) of the primary carrier, $m = \lfloor n_{PUCCH}^{(3)} / N_{SF,0}^{PUCCH} \rfloor$, wherein $N_{SF,0}^{PUCCH}$ refers to the SF length in the first slot and $n_s$ is the index of slot in a radio frame; and $n_{OC} = g(n_{PUCCH}^{(3)})$, wherein detail form of $g(\square)$ has not been determined yet.

Different from the PUCCH format 1/1a/1b in LTE Rel-8 system, each RE (Resource Element) in a SC-FDMA symbol in the PUCCH format 3 corresponds to a different modulation symbol, that is, frequency-domain spreading is not used, and different user data are distinguished by orthogonal method only through the time domain OC sequence. In case different UE in the same frequency domain resource in adjacent cells use the same OC sequence, transmitted data of multi-user will interfere with each other, and such adjacent cell interference is very serious particularly to the cell edge users. And PUCCH demodulation performance of target cell users will be directly influenced if the user's transmit power in interfered cell is great.

In the procedure of realizing the objects of the present invention, at least the following defects existing in the prior art were found:
Currently in LTE-A system, the existing PUCCH format 3 transmission program cannot solve the inter-cell interference in case of multiple UEs in different cells using the same OC sequence on the same resource.

SUMMARY OF THE PRESENT INVENTION

The present invention aims to provide a scrambled transmission method and device thereof for solving inter-cell interference occurring in case UE on the same resource between different cells uses the same time domain spreading sequence. The following technical programs are adopted in the embodiments of the present invention:

A user terminal generating the message to be sent and modulating the message to be sent to generate the data modulation symbols;

The user terminal scrambling the data modulation symbols using a cell-specific scrambling sequence, to generate the scrambled data modulation symbols;

The user terminal sending the scrambled data modulation symbols via a DFT-S-OFDM transmission structure with a time domain spreading.

A user terminal, which comprises:

Data generation module, used for generating the message to be sent and modulating the message to be sent to generate the data modulation symbols;

Scrambling module, used for scrambling the data modulation symbols using a cell-specific scrambling sequence, to generate the scrambled data modulation symbols;

Sending module, used for sending the scrambled data modulation symbols via a DFT-S-OFDM transmission structure with a time domain spreading.

A scrambled transmission method, which comprises the following steps:

A base station receiving the data modulation symbols sent by a user terminal via a DFT-S-OFDM transmission structure with a time domain despreading;

The base station descrambling the received data modulation symbols using a cell-specific descrambling sequence.

A base station equipment, which comprises:

Receiving module, used for receiving the data modulation symbols sent by a user terminal via a DFT-S-OFDM transmission structure with a time domain despreading;

Descrambling module, used for descrambling the received data modulation symbols using a cell-specific descrambling sequence.

According to the embodiments of the present invention, using the cell-specific scrambling sequence of a cell to scramble the data modulation symbols generated by UE can reduce the interference among different user terminal data on the same resource in adjacent cells, thus improve the detection performance of uplink control signals.

DETAILED DESCRIPTION OF THE EMBODIMENTS OF THE PRESENT INVENTION

Figure 1:
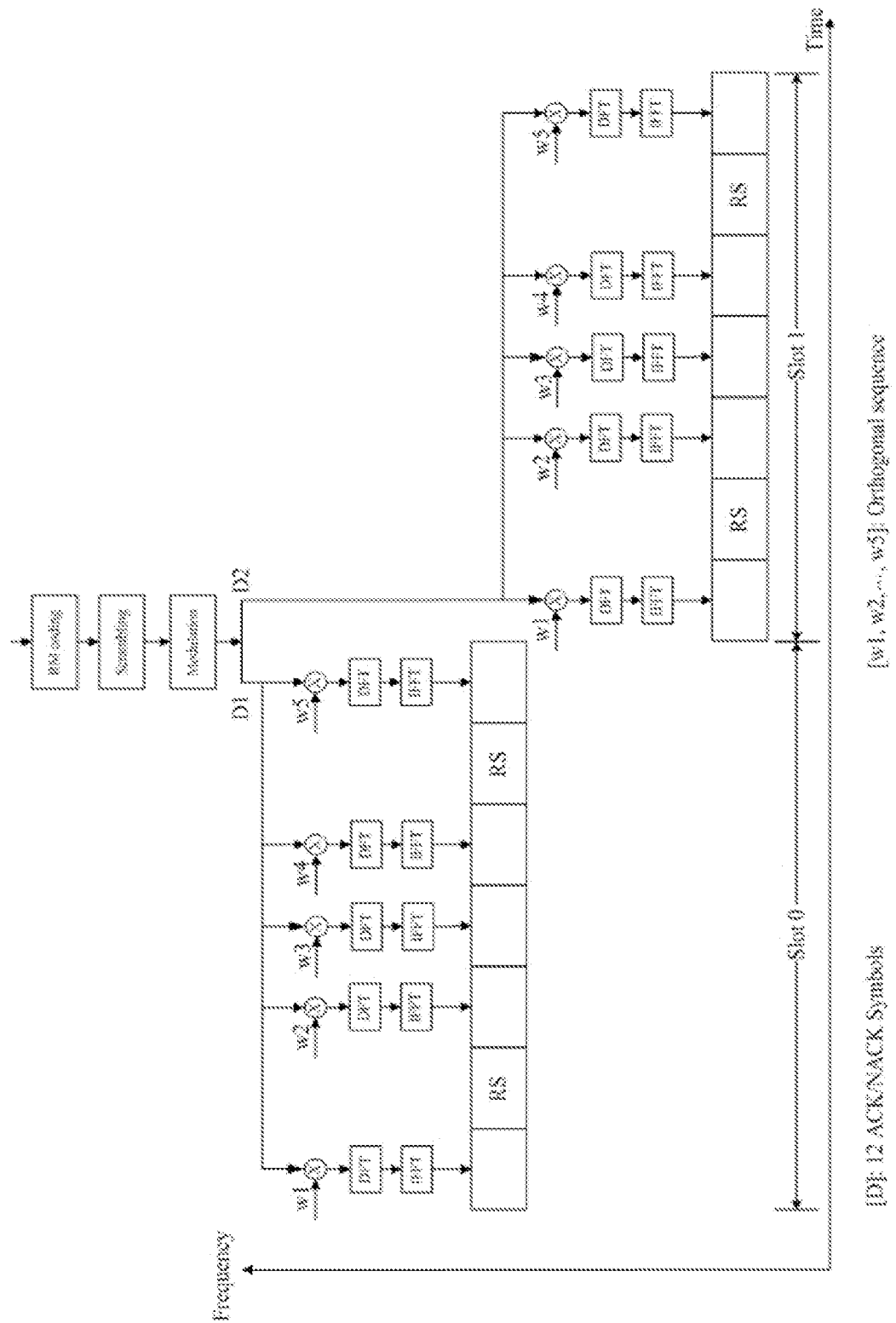
FIG. 1 is a structural diagram of PUCCH format 3 transmission under Normal CP in the prior art.
Figure 2:
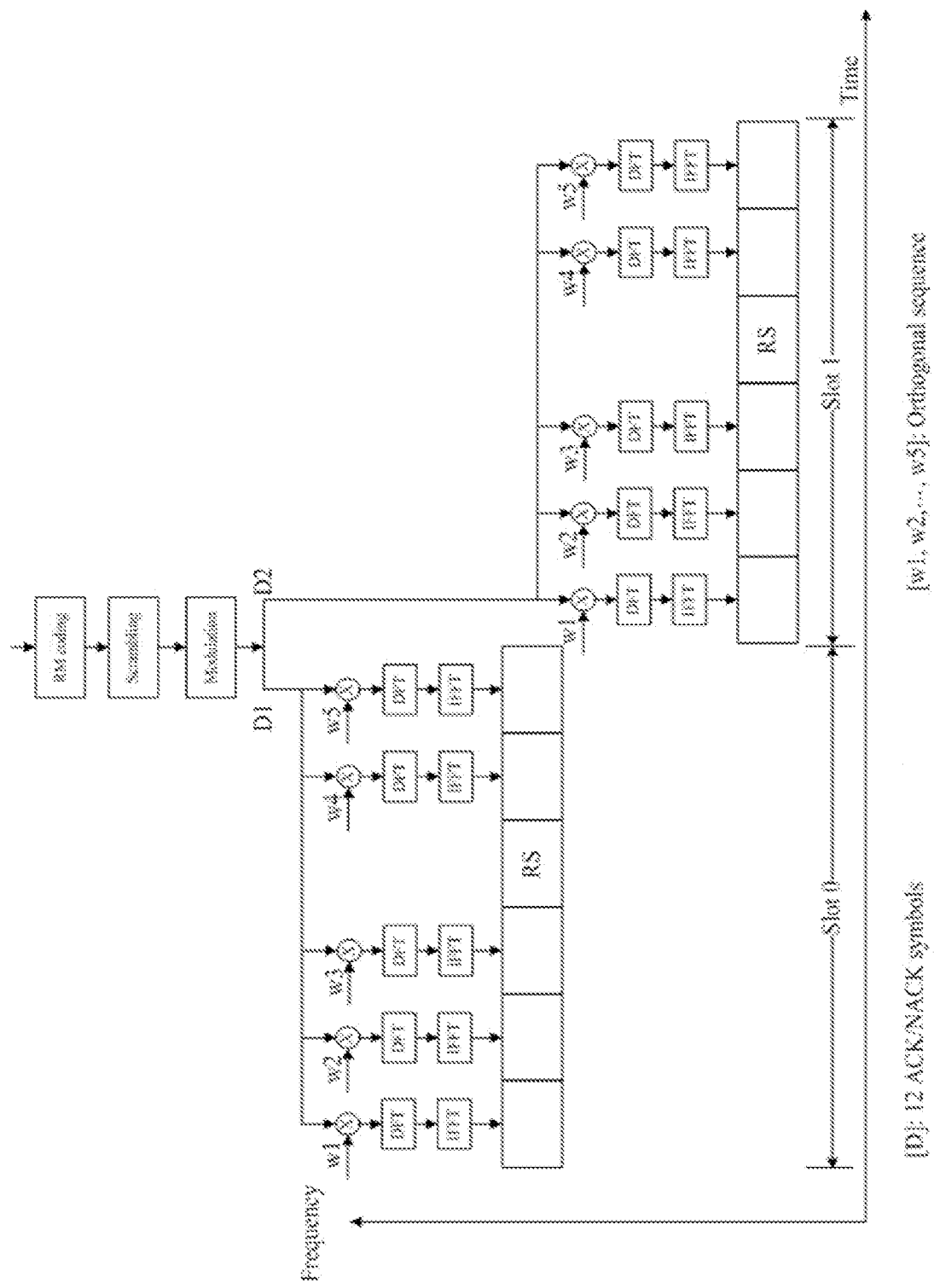
FIG. 2 is a structural diagram of PUCCH format 3 transmission under Extended CP in the prior art.
Figure 3:
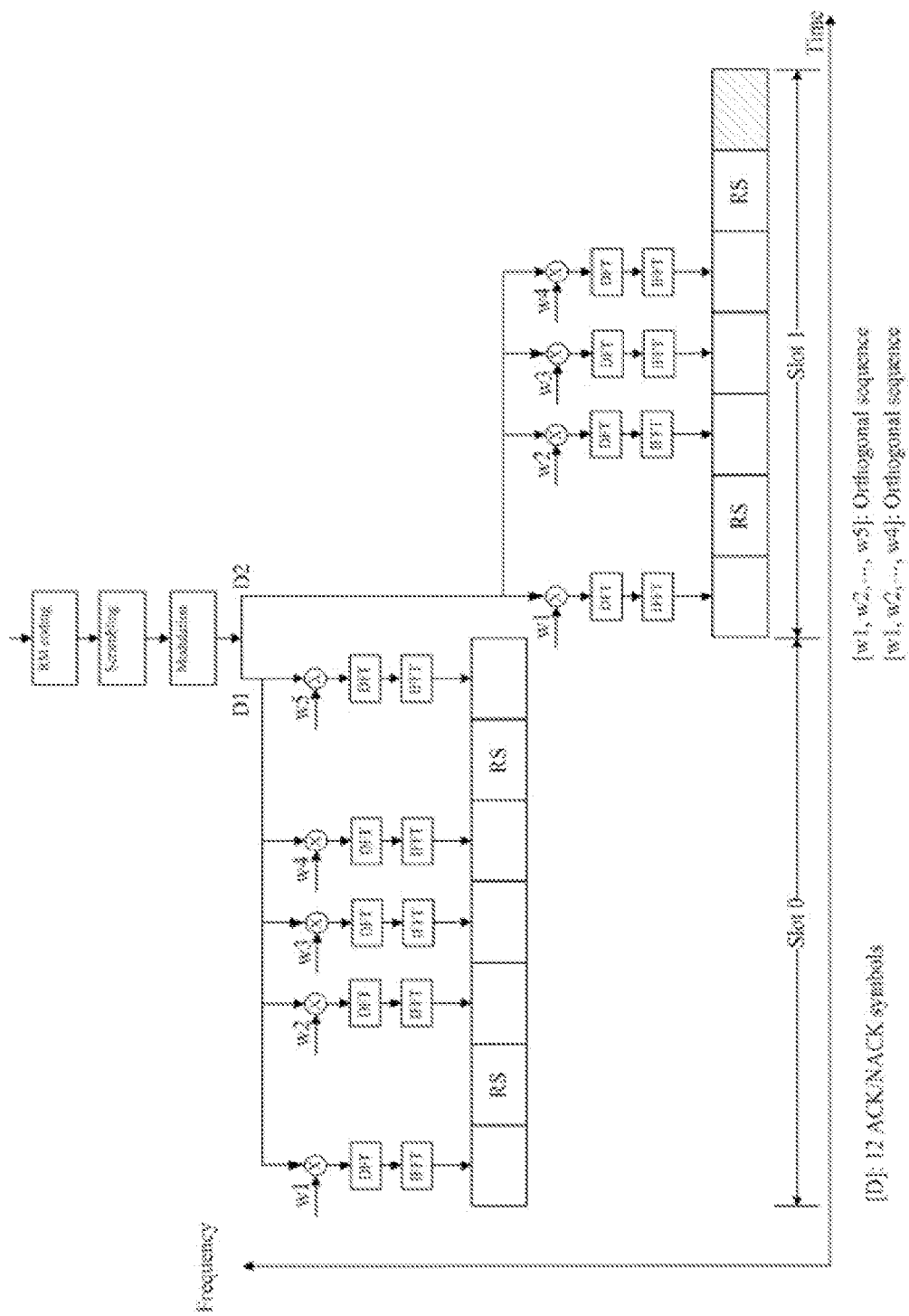
FIG. 3 is a structural diagram of PUCCH format 3 shortened format transmission in the prior art.

As described in the background of the present invention, LTE-A system defines PUCCH format 3 as an ACK/NACK multiplexing transmission program. For PUCCH format 3, multiplexing transmission of multiple UE on the same physics resource block can be achieved by configuring different OC sequences for multiple UEs. UEs in different cells but working on the same frequency domain resource may use the same OC sequence, thus causing inter-cell interference, and such inter-cell interference is very serious particularly to the cell edge users. And PUCCH detection performance of the users in the target cell will be directly influenced if user's transmission power in interfered cell is great. To reduce such inter-cell interference, the embodiments of the present invention gives a transmission program for cell-specific scrambling of information transmission via PUCCH format 3.

For the embodiments of the present invention in LTE-A system, when UE uses DFT-S-OFDM based transmission structure to transmit uplink control signal via a time domain spreading method, it can adopts cell-specific scrambling transmission method provided in the embodiments of the present invention for scrambling. This scrambling operation is developed in a time domain, namely, before the DFT (Discrete Fourier Transform) precoding and after the QPSK (Quadrature Phase Shift Keying) modulation, and it also can be conducted before or after the time domain spreading.

Therein, the method for transmitting uplink control information via a time domain spreading method by utilizing a DFT-S-OFDM transmission structure includes but is not limited to the PUCCH format 3 transmission method.

This scrambling operation is cell-specific, that is, the scrambling sequence is the cell-specific scrambling sequence and scrambling sequences of different cells are different. To ensure the scrambling sequence is cell-specific, generation of this scrambling sequence relates to the cell ID $N_{ID}^{cell}$ at least, that is, initialization of the scrambling sequence needs to relate to $N_{ID}^{cell}$ at least. The scrambling sequence can be generated not only through cell ID $N_{ID}^{cell}$, but also through $N_{ID}^{cell}$ and one of the following parameters or according to the cell ID and any combination of the following parameters: $n_f=0, 1, \ldots$, refers to the index of radio frame in the system; $n_s=0, 1, \ldots, 19$ refers to the index of slot in a radio frame; $\lfloor n_s \rfloor=0, 1, \ldots, 9$ refers to the index of subframe in a radio frame; $l=0, 1, \ldots, N_{symb}^{UL}-1$ refers to the index of SC-FDMA symbol in a slot and $N_{symb}^{UL}$ refers to the total number of SC-FDMA symbols in a slot.

To be specific, the scrambling sequence can be generated on the basis of pseudo-random sequence, which can be generated through Gold sequence with length of 31 based on $N_{ID}^{cell}$ or any combination of $N_{ID}^{cell}$ with $n_f$, $n_s$, $\lfloor n_s \rfloor$, $l$ and other parameters, that is:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad [2]$$

Wherein, $N_C=1600$, initialization parameter of the first m sequence $x_1(n)$ is $x_1(0)=1$, $x_1(n)=0$, $n=1, 2, \ldots, 30$; definition form of initialization parameter of the second m sequence $x_2(n)$ is $c_{init}=\Sigma_{i=0}^{30} x_2(i) \cdot 2^i$. $c_{init}$ is related to determinant of scrambling sequence initialization, that is to say, initialization parameter thereof is determined through $N_{ID}^{cell}$ or any combination of $N_{ID}^{cell}$ with $n_f$, $n_s$, $\lfloor n_s \rfloor$, l and other parameters. For example, $c_{init}$ can be calculated through one of the following formulae (3) to (8):

$$c_{init} = N_{ID}^{cell} \qquad [3]$$

$$c_{init} = \lfloor n_s/2 \rfloor \cdot 2^9 + N_{ID}^{cell} \qquad [4]$$

$$c_{init} = n_s \cdot 2^9 + N_{ID}^{cell} \qquad [5]$$

$$c_{init} = (\lfloor n_s/2 \rfloor + 1) \cdot (2N_{ID}^{cell} + 1) \cdot 2^9 + N_{ID}^{cell} \qquad [6]$$

$$c_{init} = 2^{10} \cdot (7 \cdot (n_s + 1) + l + 1) \cdot (2N_{ID}^{cell} + 1) + 2 \cdot N_{ID}^{cell} \qquad [7]$$

$$c_{init} = 2^{10} \cdot (7 \cdot (n_s + 1) + l + 1) \cdot (2N_{ID}^{cell} + 1) + 2 \cdot N_{ID}^{cell} + N_{CP} \qquad [8]$$

Wherein, $N_{CP} = \begin{cases} 1, \text{ normal } CP \\ 0, \text{ extended } CP. \end{cases}$ The scrambling sequence can be obtained further through deformation or expansion of pseudo-random sequence generated via the aforementioned method. For example, 0 element in the generated pseudo-random sequence is replaced with −1 or $e^{\pm j\pi/2}$ to obtain the scrambling sequence; or, the scrambling sequence can be obtained through corresponding x-QAM (Quadrature Amplitude Modulation) by taking every k (the amount) elements in the generated pseudo-random sequence as a group, wherein x represents the scale; for example, every 1 element in the pseudo-random sequence is taken as a group for BPSK (Binary Phase Shift Keying) modulation; or every 2 elements in the pseudo-random sequence is taken as a group for 2-QAM modulation, also known as QPSK modulation; or every 4 elements in the pseudo-random sequence is taken as a group for 4-QAM modulation, also known as 16QAM modulation; or every 6 elements in the pseudo-random sequence is taken as a group for 6-QAM modulation, also known as 64QAM modulation.

To be specific, UE can adopts the following programs to enable scrambling by using the cell-specific scrambling sequence of a cell:

Program I: generate a scrambling sequence based on the amount of data modulation symbols in the subframe, and then use this scrambling sequence to scramble data modulation symbols in the subframe. Therein, scrambling values in the scrambling sequence respectively correspond to corresponding data modulation symbols in the subframe.

To be specific, any one of the following three methods (1, 2 and 3) can be used in concrete implementations of program I:

Method 1: generate a scrambling sequence based on the total number of data modulation symbols in each uplink subframe and respectively scramble the data in each uplink subframe. That is: firstly generate scrambling sequence $c_j(n)$ with length of $$K_j = \sum_{i=0}^{S-1} N_{sc}^{PUCCH} \cdot SF_i$$

for each subframe; and then scramble data modulation symbols in multiple slots in subframe j in a unified manner, namely, $\tilde{d}_j(n) = d_j(n) \cdot c_j(n)$, wherein, n=0, 1, ..., $K_j$−1, $d_j(n)$ refers to the sequence of data modulation symbols in multiple slots in subframe j (i.e. data modulation symbol sequence that is obtained through series connection of modulation symbols in $$\sum_{i=0}^{S-1} SF_i$$

SC-FDMA used for data transmission in a subframe, in the order of either time domain first and then frequency domain or frequency domain first and then time domain). Preferably, generation of scrambling sequence $c_j(n)$ at least relates to cell identification (also called cell ID, $N_{ID}^{cell}$) or the combination of cell ID and the index of subframe ($\lfloor n_s \rfloor$).

Method 2: generate a scrambling sequence based on the total number of data modulation symbols in each slot and respectively scramble the data in each slot. That is: firstly generate scrambling sequence $c_i(n)$ with length of $K_i = N_{sc}^{PUCCH} \cdot SF_i$ for each slot; and then scramble data modulation symbols in slot i in a subframe, namely, $\tilde{d}_i(n) = d_i(n) \cdot c_i(n)$, wherein, n=0, 1, ... $K_i$−1, i=0, ..., S−1 refers to slot index in a subframe and $d_i(n)$ refers to the sequence of data modulation symbols in slot i in a subframe (i.e. data modulation symbol sequence that is obtained through series connection of modulation symbols in $SF_i$ SC-FDMA used for data transmission in slot i in a subframe, in the order of either time domain first and then frequency domain or frequency domain first and then time domain). Preferably, generation of scrambling sequence $c_i(n)$ at least relates to cell ID ($N_{ID}^{cell}$) or the combination of cell ID and the index of slot ($n_s$).

Method 3: generate a scrambling sequence based on the total number of data modulation symbols in each SC-FDMA symbol used for data transmission and respectively scramble the data on each SC-FDMA symbol. That is: firstly generate scrambling sequence $c_l(n)$ with length of $K_l = N_{sc}^{PUCCH}$ for each SC-FDMA symbol used for data transmission; and then scramble data modulation symbols in SC-FDMA symbol l used for data transmission, namely, $\tilde{d}_l(n) = d_l(n) \cdot c_l(n)$, wherein, n=0, 1, ... $K_l$−1, l=0, 1, ... $N_{symb}^{UL}$−1 refers to the index of SC-FDMA symbol in a slot and $d_l(n)$ refers to the sequence of data modulation symbols in SC-FDMA symbol l used for data transmission; particularly, if SC-FDMA symbol l is pilot frequency data, the aforementioned scrambling operation is unnecessary. Preferably, generation of scrambling sequence $c_l(n)$ at least relates to cell ID ($N_{ID}^{cell}$) or the combination of cell ID and SC-FDMA symbol number (l).

Program II: scramble based on SC-FDMA symbol used for data transmission in a subframe, that is, generate a scrambling sequence based on the amount of SC-FDMA symbols used for data transmission in the subframe and then use this scrambling sequence to scramble data modulation symbols in the subframe. Therein, scrambling values in the scrambling sequence respectively correspond to corresponding SC-FDMA symbols used for data transmission in the subframe, and the same scrambling values are used to scramble $N_{sc}^{PUCCH}$ data modulation symbols on frequency domain in the SC-FDMA symbol.

To be specific, any one of the following three methods (4, 5 and 6) can be used in concrete implementations of program II:

Method 4: generate a scrambling sequence based on the total number of SC-FDMA symbols used for data transmission in a subframe and respectively scramble the data in each uplink subframe. That is: firstly generate scrambling sequence $c_j(m)$ with length of $$K_j = \sum_{i=0}^{S-1} SF_i$$

for each subframe; and then scramble data modulation symbols in multiple slots in subframe j, namely, $\tilde{d}_j(m \cdot N_{sc}^{PUCCH}+n) = c_j(m) \cdot d_j(m \cdot N_{sc}^{PUCCH}+n)$, wherein, m=0, ..., $K_j$–1, n=0, 1, ... $N_{sc}^{PUCCH}$–1, and $d_j(\bullet)$ refers to the sequence of data modulation symbols in multiple slots in subframe j (i.e. serial sequence of modulation symbols in $$\sum_{i=0}^{S-1} SF_i$$

SC-FDMA used for data transmission in a subframe). Preferably, generation of scrambling sequence $c_j(m)$ at least relates to cell ID ($N_{ID}^{cell}$) or the combination of cell ID and the index of subframe ($\lfloor n_s \rfloor$).

Method 5: generate a scrambling sequence based on the total number of SC-FDMA symbols of transmitted in a slot and respectively scramble the data in each slot. That is: firstly generate scrambling sequence $c_i(m)$ with length of $K_i = SF_i$ for each slot; and then scramble data modulation symbols in slot i in a subframe, namely, $\tilde{d}_i(m \cdot N_{sc}^{PUCCH}+n) = c_i(m) \cdot d_i(m \cdot N_{sc}^{PUCCH}+n)$, wherein, i=0, ... S–1 refers to slot index in a subframe, m=0, ..., $K_i$–1, n=0, 1, ... $N_{sc}^{PUCCH}$–1, and $d_i(\bullet)$ refers to the sequence of data modulation symbols in slot i in a subframe (i.e. serial sequence of modulation symbols in $SF_i$ SC-FDMA used for data transmission in slot i in a subframe). Preferably, generation of scrambling sequence $c_i(m)$ at least relates to cell ID ($N_{ID}^{cell}$) or the combination of cell ID and the index of slot ($n_s$).

Method 6: generate a scrambling sequence for each SC-FDMA symbol used for data transmission and respectively scramble the data on each SC-FDMA symbol used for data transmission. That is: firstly generate scrambling sequence $c_l$ with length of $K_l=1$ for each SC-FDMA symbol used for data transmission; and then scramble data modulation symbols in SC-FDMA symbol l used for data transmission, namely, $\tilde{d}_l(n) = c_l \cdot d_l(n)$, wherein, l=0, 1, ..., $N_{symb}^{UL}$–1 refers to the index of SC-FDMA in a slot, n=0, 1, ... $N_{sc}^{PUCCH}$–1, and $d_l(n)$ refers to the sequence of data modulation symbols in SC-FDMA symbol l used for data transmission; particularly, if SC-FDMA symbol l is pilot frequency data, the scrambling operation is unnecessary. Preferably, generation of scrambling sequence $c_l$ at least relates to cell ID ($N_{ID}^{cell}$) or the combination of cell ID and SC-FDMA symbol number (l).

Correspondingly, the data received at base station side will be descrambled via descrambling methods corresponding to the aforementioned scrambling methods. That is, the base station receives data through PUCCH format 3 transmission program, generates a descrambling sequence using one of methods 1 to 6 of the same UE, and descrambles the received data by utilizing the generated descrambling sequence. To be specific, the base station receives data modulation symbols via a DFT-S-OFDM transmission structure with a time domain despreading, and this symbol is sent by a user terminal. This base station descrambles the received data modulation symbol using the cell-specific descrambling sequence of a cell. Therein, if UE uses the aforementioned program I for scrambling, the base station will generate a descrambling sequence based on the amount of data modulation symbols in a subframe and then descramble the data modulation symbols in the subframe using the descrambling sequence. And descrambling values in the descrambling sequence respectively correspond to corresponding data modulation symbols in the subframe; while if UE uses the aforementioned program II for scrambling, the base station will generate a descrambling sequence based on the amount of SC-FDMA symbols used for data transmission in a subframe and then descramble the data modulation symbols in the subframe using the descrambling sequence. And descrambling values in the descrambling sequence respectively correspond to corresponding SC-FDMA symbols used for data transmission in the subframe. To be specific:

In case of adopting method 1, the base station generates descrambling sequence $c_j(n)$ with length of $$K_j = \sum_{i=0}^{S-1} N_{sc}^{PUCCH} \cdot SF_i$$

for each subframe based on the total number of the data modulation symbols in each subframe, and descrambles the data modulation symbols in subframe j;

In case of adopting method 2, the base station generates descrambling sequence $c_i(n)$ with length of $K_i = N_{sc}^{PUCCH} \cdot SF_i$ for each slot based on the total number of data modulation symbols in each slot in a subframe, and descrambles data modulation symbols in slot i in a subframe;

In case of adopting method 3, the base station generates descrambling sequence $c_l(n)$ with length of $K_l = N_{sc}^{PUCCH}$ for each SC-FDMA symbol used for data transmission based on the total number of data modulation symbols in each SC-FDMA symbol used for data transmission in a subframe, and descrambles data modulation symbols in SC-FDMA symbol l used for data transmission.

In case of adopting method 4, the base station generates descrambling sequence $c_j(m)$ with length of $$K_j = \sum_{i=0}^{S-1} SF_i$$

for each subframe based on the total number of SC-FDMA symbols used for data transmission in each subframe, descramble data modulation symbols in subframe j;

In case of adopting method 5, based on the amount of SC-FDMA symbols used for data transmission in each slot, the base station generates scrambling sequence $c_i(m)$ with length of $K_i = SF_i$ for each slot to descramble data modulation symbols in slot i in a subframe;

In case of adopting method 6, the base station generates descrambling sequence $c_l$ with length of $K_l=1$ for each SC-FDMA symbol used for data transmission to descramble data modulation symbols in SC-FDMA symbol l used for data transmission.

In the aforementioned process, the cell-specific descrambling sequence of a cell generated by the base station is generated at least according to cell ID ($N_{ID}^{cell}$) or according to cell ID and one of the following parameters or according to the cell ID and any combination of the following parameters: index of radio frame ($n_f$), index of slot ($n_s$) in a radio frame, index of subframe ($\lfloor n_s \rfloor$) in a radio frame, and index of SC-FDMA symbol (l) in a slot.

Two application examples are given below to further explain the embodiments of the present invention.

Example I

Figure 4A:
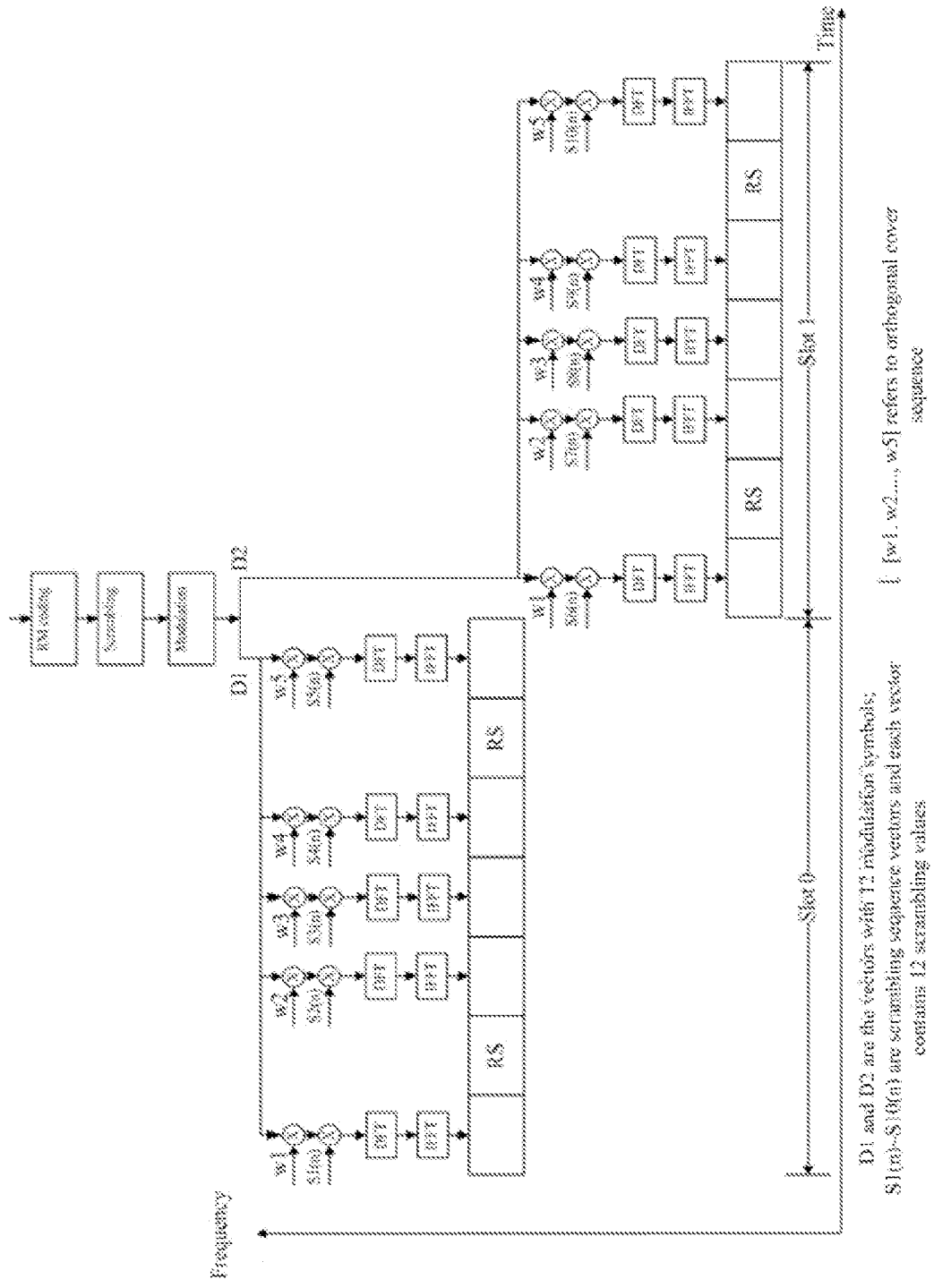
FIG. 4A is the diagram of scrambling via method 1, 2 or 3 provided in Embodiment I of the present invention.
Figure 4B:
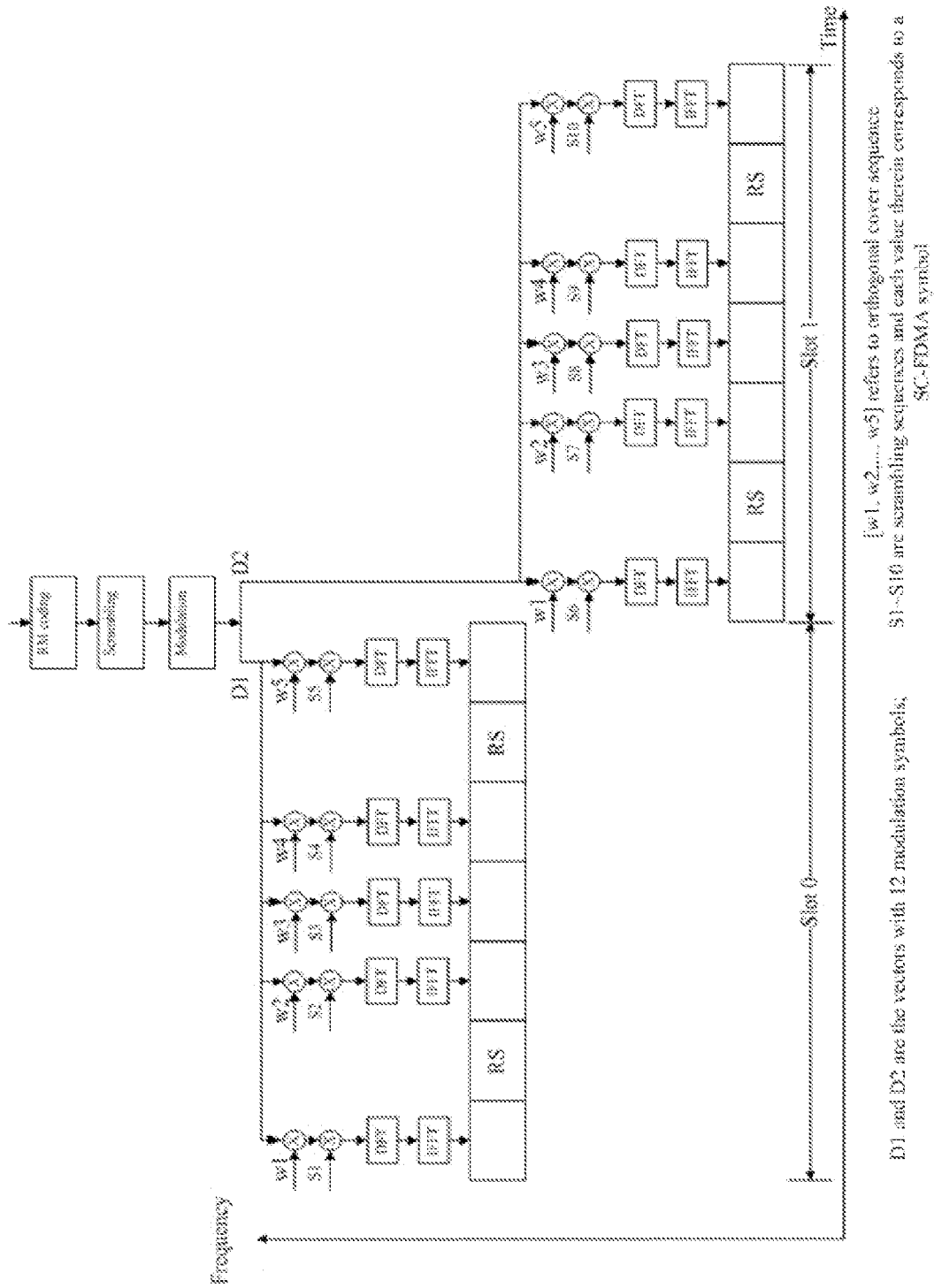
FIG. 4B is the diagram of scrambling via method 4, 5 or 6 provided in Embodiment I of the present invention.

UE transmits ACK/NACK message through PUCCH format 3 normal format, and $SF_i=5$, i=0, 1 and $N_{sc}^{PUCCH}=12$ at this time. Firstly UE generates ACK/NACK feedback information sequence and then scramble the modulated symbols (hereinafter referred to as modulation symbols) via the method provided in the embodiments of the present invention after RM coding, bit-level scrambling, QPSK modulation and time domain spreading spectrum, as shown in FIG. 4A or FIG. 4B. Therein, UE generates a pseudo-random sequence through Gold sequence with length of 31 and takes every 2 elements in the pseudo-random sequence as a group to develop QPSK modulation to achieve a scrambling sequence. The specific process of the cell-specific scrambled transmission by UE through the aforementioned methods 1 to 6 is as follows:

UE Side:

(1) In case of adopting method 1: UE generates a scrambling sequence with length of $$K_j = \sum_{i=0}^{S-1} N_{sc}^{PUCCH} \cdot SF_i = 12 \cdot 5 + 12 \cdot 5 = 120$$

for each subframe; if the definition of initialization parameter generated by the scrambling sequence only relates to cell ID ($N_{ID}^{cell}$), such as $c_{init}=N_{ID}^{cell}$, the scrambling sequences generated by UE for all subframes will be the same, namely, $S1(n)\sim S10(n)$ are the same for each subframe; if the definition of initialization parameter generated by the scrambling sequence relates to cell ID ($N_{ID}^{cell}$) and the index of subframe ($\lfloor n_s/2 \rfloor$), such as $c_{init}=\lfloor n_s/2 \rfloor \cdot 2^9 + N_{ID}^{cell}$, the scrambling sequences generated by UE for all subframes will be different, namely, $S1(n)\sim S10(n)$ may be different for each subframe, and initial value generated by the scrambling sequence needs to be updated in each subframe. For each subframe, based on the generated scrambling sequence, UE will scramble through point-by-point multiplication of 120 modulation symbols in 10 SC-FDMA symbols used for data transmission in a subframe and the scrambling sequence with length of 120 and then send them after DFT precoding and IFFT (Inverse Fast Fourier Transform). The details are shown in FIG. 4A.

(2) In case of adopting method 2: UE generates a scrambling sequence with length of $K_j=N_{sc}^{PUCCH} \cdot SF_i=12 \cdot 5=60$ for each slot; if the definition of initialization parameter generated by the scrambling sequence only relates to cell ID ($N_{ID}^{cell}$), such as $c_{init}=N_{ID}^{cell}$, the scrambling sequences generated by UE for all slots will be the same, namely, $S1(n)\sim S5(n)$ and $S6(n)\sim S10(n)$ are the same; if the definition of initialization parameter generated by the scrambling sequence relates to cell ID ($N_{ID}^{cell}$) and the index of slot ($n_s$), such as $c_{init}=n_s \cdot 2^9 + N_{ID}^{cell}$, the scrambling sequences generated by UE for all slots will be different, namely, $S1(n)\sim S5(n)$ and $S6(n)\sim S10(n)$ may be different, and initial value generated by the scrambling sequence needs to be updated in each slot. For each slot, based on the generated scrambling sequence, UE will scramble through point-by-point multiplication of 60 modulation symbols in 5 SC-FDMA symbols used for data transmission in a slot and the scrambling sequence with length of 60 and then send them after DFT precoding and IFFT. The details are shown in FIG. 4A.

(3) In case of adopting method 3: UE generates a scrambling sequence with length of $K_j=N_{sc}^{PUCCH}=12$ for each SC-FDMA symbol; if the definition of initialization parameter generated by the scrambling sequence only relates to cell ID ($N_{ID}^{cell}$), such as $c_{init}=N_{ID}^{cell}$, the scrambling sequences generated by UE for all SC-FDMA symbols will be the same, namely, the sequences in $S1(n)$ to $S10(n)$ are the same; if the definition of initialization parameter generated by the scrambling sequence relates to cell ID ($N_{ID}^{cell}$) and SC-FDMA symbol number (l), such as $c_{init}=2^{10} \cdot (7 \cdot (n_s+1)+l+1) \cdot (2N_{ID}^{cell}+1)+2 \cdot N_{ID}^{cell}$, the scrambling sequences generated by UE for all SC-FDMA will be different, namely, the sequences in $S1(n)$ to $S10(n)$ may be different, and initial value generated by the scrambling sequence needs to be updated in each SC-FDMA symbol used for data transmission. For each SC-FDMA symbol, based on the generated scrambling sequence, UE will scramble through point-by-point multiplication of 12 modulation symbols in a SC-FDMA symbol used for data transmission and the scrambling sequence with length of 12 and then send them after DFT precoding and IFFT. The details are shown in FIG. 4A.

(4) In case of adopting method 4: UE generates a scrambling sequence with length of $$K_j = \sum_{i=0}^{S-1} SF_i = 5 + 5 = 10$$

for each subframe; if the definition of initialization parameter generated by the scrambling sequence only relates to cell ID ($N_{ID}^{cell}$), such as $c_{init}=N_{ID}^{cell}$, the scrambling sequences generated by UE for all subframes will be the same, namely, S1~S10 are the same for each subframe; if the definition of initialization parameter generated by the scrambling sequence relates to cell ID ($N_{ID}^{cell}$) and the index of subframe ($\lfloor n_s/2 \rfloor$), such as $c_{init}=\lfloor n_s/2 \rfloor \cdot 2^9 + N_{ID}^{cell}$, the scrambling sequences generated by UE for all subframes will be different, namely, S1~S10 may be different for each subframe, and initial value generated by the scrambling sequence needs to be updated in each subframe. Each scrambling value in the scrambling sequence with length of 10 corresponds to a SC-FDMA symbol used for data transmission in this subframe, and 12 modulation symbols in each SC-FDMA symbol are multiplied by the same scrambling value and then are sent after DFT precoding and IFFT. The details are shown in FIG. 4B.

(5) In case of adopting method 5: UE generates a scrambling sequence with length of $K_j=SF_i=5$ for each slot; if the definition of initialization parameter generated by the scrambling sequence only relates to cell ID ($N_{ID}^{cell}$), such as $c_{init}=N_{ID}^{cell}$, the scrambling sequences generated by UE for all slots will be the same, namely, S1~S5 and S6~S10 are the same; if the definition of initialization parameter generated by the scrambling sequence relates to cell ID ($N_{ID}^{cell}$) and the index of slot ($n_s$), such as $c_{init}=n_s \cdot 2^9 + N_{ID}^{cell}$, the scrambling sequences generated by UE for all slots will be different, namely, S1~S5 and S6~S10 may be different, and initial value generated by the scrambling sequence needs to be updated in each slot. Each scrambling value in the scrambling sequence with length of 5 corresponds to a SC-FDMA symbol used for data transmission in this slot, and 12 modulation symbols in each SC-FDMA symbol are multiplied by the same scrambling value and then are sent after DFT precoding and IFFT. The details are shown in FIG. 4B.

(6) In case of adopting method 6: UE generates a scrambling sequence with length of $K_j=1$ for each SC-FDMA symbol; if the definition of initialization parameter generated by the scrambling sequence only relates to cell ID ($N_{ID}^{cell}$), such as $c_{init}=N_{ID}^{cell}$, the scrambling sequences generated by UE for all SC-FDMA symbols will be the same, namely, the values in S1 to S10 are the same; if the definition of initialization parameter generated by the scrambling sequence relates to cell ID ($N_{ID}^{cell}$) and SC-FDMA symbol number (l), such as $c_{init}=2^{10}\cdot(7\cdot(n_s+1)+l+1)\cdot(2N_{ID}^{cell}+1)+2\cdot N_{ID}^{cell}$, the scrambling sequences generated by UE for all SC-FDMA will be different, namely, the values in S1 to S10 may be different, and initial value generated by the scrambling sequence needs to be updated in each SC-FDMA symbol used for data transmission. For each SC-FDMA symbol, based on the generated scrambling sequence, UE will scramble by multiplying 12 modulation symbols in a SC-FDMA symbol used for data transmission and a corresponding scrambling value and then send them after DFT precoding and IFFT. The details are shown in FIG. 4B.

Furthermore, UE transmits the scrambled modulation symbol sequence using PUCCH format 3 transmission program.

Base Station Side:

It receives data through PUCCH format 3 transmission program, generates a descrambling sequence by adopting one of methods 1 to 6 the same as UE side and descrambles the received data through the generated descrambling sequence. To be specific:

(1) In case of adopting method 1: the base station generates a descrambling sequence with length of $$K_j = \sum_{i=0}^{S-1} N_{sc}^{PUCCH} \cdot SF_i = 12.5 + 12.5 = 120$$

for each subframe; if the definition of initialization parameter generated by the descrambling sequence only relates to cell ID ($N_{ID}^{cell}$) such as $c_{init}=N_{ID}^{cell}$, the descrambling sequences generated by the base station for all subframes will be the same; if the definition of initialization parameter generated by the descrambling sequence relates to cell ID ($N_{ID}^{cell}$) and the index of subframe ($\lfloor n_s/2 \rfloor$), such as $c_{init}=\lfloor n_s/2 \rfloor \cdot 2^9+N_{ID}^{cell}$, the descrambling sequences generated by the base station for all subframes will be different, namely, initial value generated by the descrambling sequence needs to be updated in each subframe. For each subframe, based on the generated descrambling sequence, UE will descramble through point-by-point operation of 120 modulation symbols in 10 SC-FDMA symbols used for data transmission in a subframe and the descrambling sequence with length of 120.

(2) In case of adopting method 2: the base station generates a descrambling sequence with length of $K_j=N_{sc}^{PUCCH}\cdot SF_i=12\cdot 5=60$ for each slot; if the definition of initialization parameter generated by the descrambling sequence only relates to cell ID ($N_{ID}^{cell}$), such as $c_{init}=N_{ID}^{cell}$, the descrambling sequences generated by the base station for all slots will be the same; if the definition of initialization parameter generated by the descrambling sequence relates to cell ID ($N_{ID}^{cell}$) and the index of slot ($n_s$), such as $c_{init}=n_s\cdot 2^9+N_{ID}^{cell}$, the scrambling sequences generated by the base station for all slots will be different, and initial value generated by the descrambling sequence needs to be updated in each slot. For each slot, based on the generated descrambling sequence, the base station will descramble through point-by-point operation of 60 modulation symbols in 5 SC-FDMA symbols used for data transmission in a slot and the descrambling sequence with length of 60.

(3) In case of adopting method 3: the base station generates a descrambling sequence with length of $K_j=N_{sc}^{PUCCH}=12$ for each SC-FDMA symbol; if the definition of initialization parameter generated by the descrambling sequence only relates to cell ID ($N_{ID}^{cell}$), such as $c_{init}=N_{ID}^{cell}$, the descrambling sequences generated by the base station for all SC-FDMA symbols will be the same; if the definition of initialization parameter generated by the descrambling sequence relates to cell ID ($N_{ID}^{cell}$) and SC-FDMA symbol number (l), such as $c_{init}=2^{10}\cdot(7\cdot(n_s+1)+l+1)\cdot(2N_{ID}^{cell}=1)+2\cdot N_{ID}^{cell}$, the descrambling sequences generated by the base station for all SC-FDMA will be different, and initial value generated by the descrambling sequence needs to be updated in each SC-FDMA symbol used for data transmission. For each SC-FDMA symbol, based on the generated descrambling sequence, the base station will descramble through point-by-point operation of 12 modulation symbols in a SC-FDMA symbol used for data transmission and the scrambling sequence with length of 12.

(4) In case of adopting method 4: the base station generates a descrambling sequence with length of $$K_j = \sum_{i=0}^{S-1} SF_i = 5 + 5 = 10$$

for each subframe; if the definition of initialization parameter generated by the descrambling sequence only relates to cell ID ($N_{ID}^{cell}$), such as $c_{init}=N_{ID}^{cell}$, the descrambling sequences generated by the base station for all subframes will be the same; if the definition of initialization parameter generated by the descrambling sequence relates to cell ID ($N_{ID}^{cell}$) and the index of subframe ($\lfloor n_s/2 \rfloor$), such as $c_{init}=\lfloor n_s/2 \rfloor \cdot 2^9+N_{ID}^{cell}$, the descrambling sequences generated by the base station for all subframes will be different, and initial value generated by the descrambling sequence needs to be updated in each subframe. Each descrambling value in the descrambling sequence with length of 10 corresponds to a SC-FDMA symbol used for data transmission in this subframe, and 12 modulation symbols in each SC-FDMA symbol uses the same descrambling value.

(5) In case of adopting method 5: the base station generates a descrambling sequence with length of $K_j=SF_i=5$ for each slot; if the definition of initialization parameter generated by the descrambling sequence only relates to cell ID ($N_{ID}^{cell}$), such as $c_{init}=N_{ID}^{cell}$, the descrambling sequences generated by the base station for all slots will be the same; if the definition of initialization parameter generated by the descrambling sequence relates to cell ID ($N_{ID}^{cell}$) and the index of slot ($n_s$), such as $c_{init}=n_s\cdot 2^9+N_{ID}^{cell}$, the descrambling sequences generated by the base station for all slots will be different, and initial value generated by the descrambling sequence needs to be updated in each slot. Each descrambling value in the descrambling sequence with length of 5 corresponds to a SC-FDMA symbol used for data transmission in this slot, and 12 modulation symbols in each SC-FDMA symbol uses the same descrambling value.

(6) In case of adopting method 6: the base station generates a descrambling sequence with length of $K_j=1$ for each SC-FDMA symbol; if the definition of initialization parameter generated by the descrambling sequence only relates to cell ID ($N_{ID}^{cell}$), such as $c_{init}=N_{ID}^{cell}$, the descrambling sequences generated by the base station for all SC-FDMA symbols will be the same; if the definition of initialization parameter generated by the descrambling sequence relates to cell ID ($N_{ID}^{cell}$) and SC-FDMA symbol number (l), such as $c_{init}=2^{10}\cdot(7\cdot(n_s+1)+l+1)\cdot(2N_{ID}^{cell}+1)+2\cdot N_{ID}^{cell}$, the descrambling sequences generated by the base station for all SC-FDMA will be different, and initial value generated by the descrambling sequence needs to be updated in each SC-FDMA symbol used for data transmission. For each SC-FDMA symbol, based on the generated descrambling sequence, the base station will descramble through operation of 12 modulation symbols in a SC-FDMA symbol used for data transmission and a corresponding descrambling value.

Embodiment II

Figure 5A:
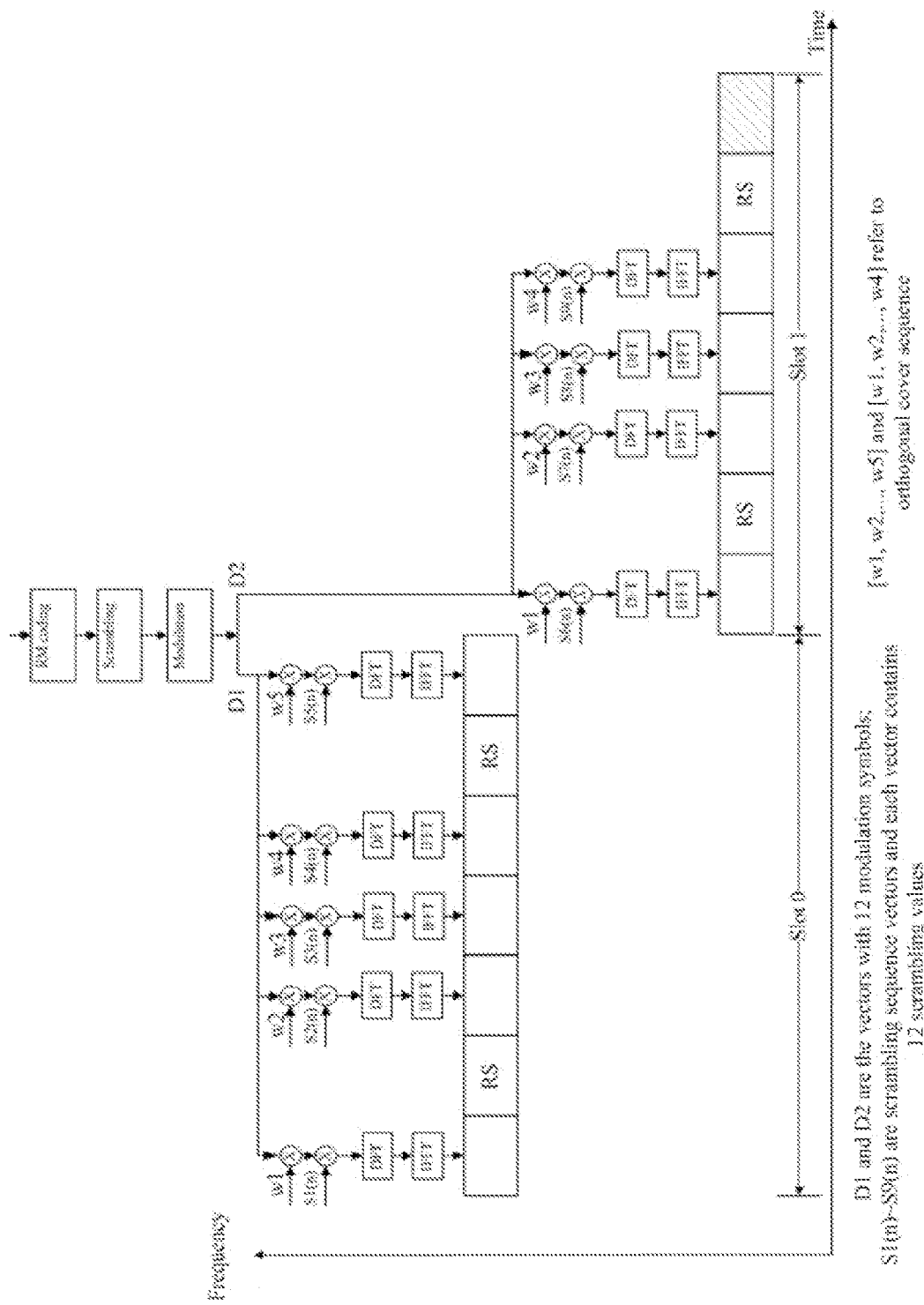
FIG. 5A is the diagram of scrambling via method 1, 2 or 3 provided in Embodiment II of the present invention.

UE transmits ACK/NACK message through PUCCH format 3 shortened format, and $SF_0=5$, $SF_1=4$ and $N_{sc}^{PUCCH}=12$ at this time. Firstly UE generates ACK/NACK feedback information sequence and then scramble QPSK modulation symbols after RM coding, bit-level scrambling, QPSK modulation and time domain spreading spectrum, as shown in FIG. 5. UE generates a pseudo-random sequence through Gold sequence with length of 31 and takes every 2 elements in the pseudo-random sequence as a group to develop QPSK modulation to achieve a scrambling sequence. The specific process of the cell-specific scrambled transmission by UE through the aforementioned methods 1 to 6 is as follows:

UE side:

(1) In case of adopting method 1: UE generates a scrambling sequence with length of $$K_j = \sum_{i=0}^{S-1} N_{sc}^{PUCCH} \cdot SF_i = 12 \cdot 5 + 12 \cdot 4 = 108$$

for each subframe; if the definition of initialization parameter generated by the scrambling sequence only relates to cell ID ($N_{ID}^{cell}$), such as $c_{init}=N_{ID}^{cell}$, the scrambling sequences generated by UE for all subframes will be the same, namely, $S1(n)\sim S9(n)$ are the same for each subframe; if the definition of initialization parameter generated by the scrambling sequence relates to cell ID ($N_{ID}^{cell}$) and the index of subframe ($\lfloor n_s/2 \rfloor$), such as $c_{init}=\lfloor n_s/2 \rfloor \cdot 2^9 + N_{ID}^{cell}$, the scrambling sequences generated by UE for all subframes will be different, namely, $S1(n)\sim S9(n)$ may be different for each subframe, and initial value generated by the scrambling sequence needs to be updated in each subframe. For each subframe, based on the generated scrambling sequence, UE will scramble through point-by-point multiplication of 108 modulation symbols in 9 SC-FDMA symbols used for data transmission in a subframe and the scrambling sequence with length of 108 and then send them after DFT precoding and IFFT. The details are shown in FIG. 5A.

(2) In case of adopting method 2: UE generates a scrambling sequence with length of $K_0=N_{sc}^{PUCCH}\cdot SF_0=12\cdot 5=60$ for the first slot and a scrambling sequence with length of $K_1=N_{sc}^{PUCCH}\cdot SF_1=12\cdot 4=48$ for the second slot; if the definition of initialization parameter generated by the scrambling sequence only relates to cell ID ($N_{ID}^{cell}$), such as $c_{init}=N_{ID}^{cell}$, initialization values of the scrambling sequences generated by UE for all slots will be the same and only the length of the intercepted scrambling sequence is different, namely, $S1(n)\sim S4(n)$ and $S6(n)\sim S9(n)$ are the same; if the definition of initialization parameter generated by the scrambling sequence relates to cell ID ($N_{ID}^{cell}$) and the index of slot ($n_s$), such as $c_{init}=n_s\cdot 2^9 + N_{ID}^{cell}$, the scrambling sequences generated by UE for all slots will be different, namely, $S1(n)\sim S4(n)$ and $S6(n)\sim S9(n)$ may be different, and initial value generated by the scrambling sequence needs to be updated in each slot. For each slot, based on the generated scrambling sequence, UE will scramble through point-by-point multiplication of 60 modulation symbols in 5 SC-FDMA symbols used for data transmission in the first slot and the scrambling sequence with length of 60, scramble through point-by-point multiplication of 48 modulation symbols in 4 SC-FDMA symbols used for data transmission in the second slot and the scrambling sequence with length of 48 and then send them after DFT precoding and IFFT. The details are shown in FIG. 5A.

(3) In case of adopting method 3: UE generates a scrambling sequence with length of $K_j=N_{sc}^{PUCCH}=12$ for each SC-FDMA symbol; if the definition of initialization parameter generated by the scrambling sequence only relates to cell ID ($N_{ID}^{cell}$), such as $c_{init}=N_{ID}^{cell}$, the scrambling sequences generated by UE for all SC-FDMA symbols will be the same, namely, the sequences in $S1(n)$ to $S9(n)$ are the same; if the definition of initialization parameter generated by the scrambling sequence relates to cell ID ($N_{ID}^{cell}$) and SC-FDMA symbol number (l), such as $c_{init}=2^{10}\cdot(7\cdot(n_s+1)+l+1)\cdot(2N_{ID}^{cell}+1)+2\cdot N_{ID}^{cell}$, the scrambling sequences generated by UE for all SC-FDMA will be different, namely, the sequences in $S1(n)$ to $S9(n)$ may be different, and initial value generated by the scrambling sequence needs to be updated in each SC-FDMA symbol used for data transmission. For each SC-FDMA symbol, based on the generated scrambling sequence, UE will scramble through point-by-point multiplication of 12 modulation symbols in a SC-FDMA symbol used for data transmission and the scrambling sequence with length of 12 and then send them after DFT precoding and IFFT. The details are shown in FIG. 5A.

Figure 5B:
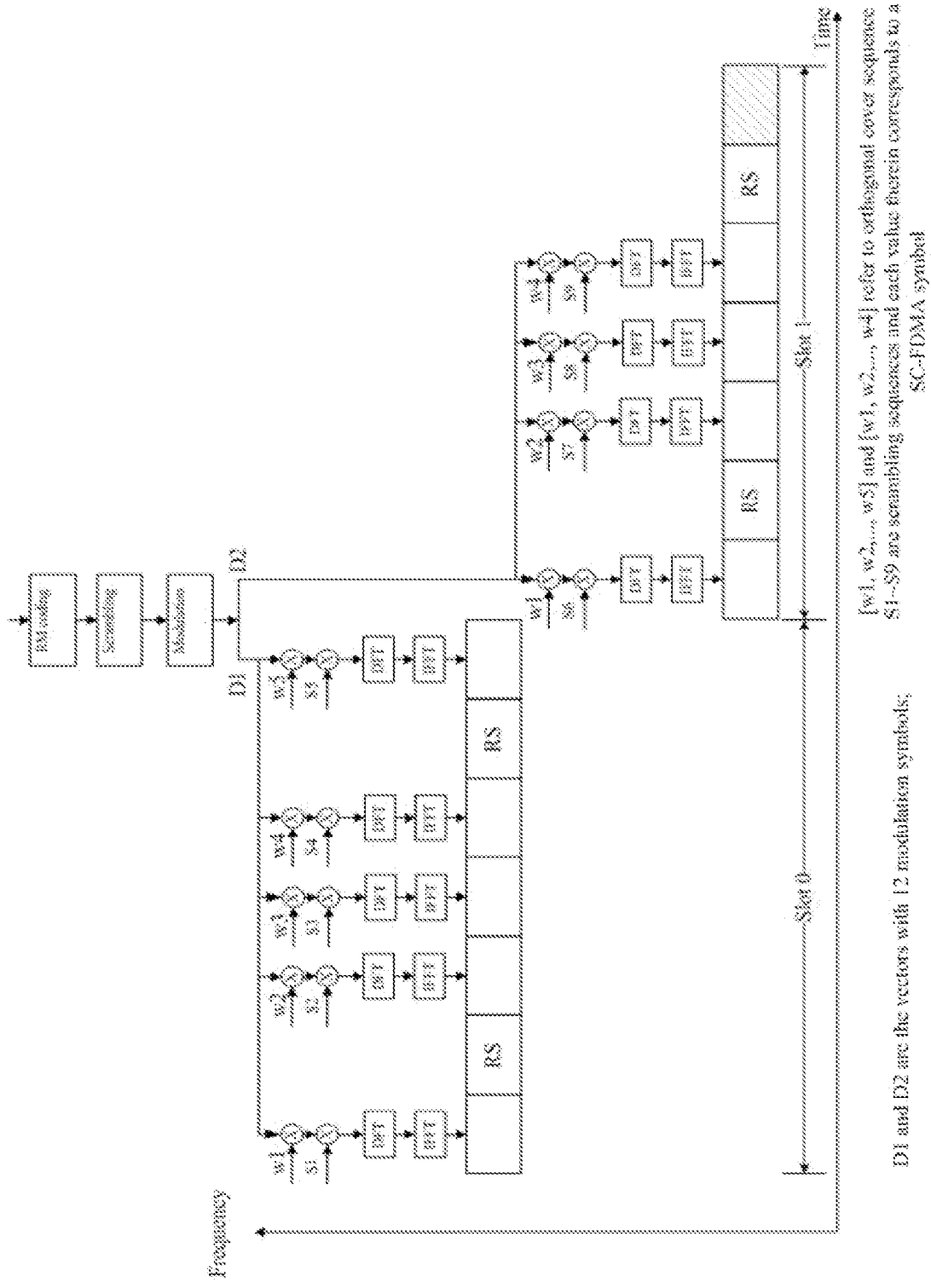
FIG. 5B is the diagram of scrambling via method 4, 5 or 6 provided in Embodiment II of the present invention.

(4) In case of adopting method 4: UE generates a scrambling sequence with length of $$K_j = \sum_{i=0}^{S-1} SF_i = 5 + 4 = 9$$

for each subframe; if the definition of initialization parameter generated by the scrambling sequence only relates to cell ID ($N_{ID}^{cell}$), such as $c_{init}=N_{ID}^{cell}$, the scrambling sequences generated by UE for all subframes will be the same, namely, $S1\sim S9$ are the same for each subframe; if the definition of initialization parameter generated by the scrambling sequence relates to cell ID ($N_{ID}^{cell}$) and the index of subframe ($\lfloor n_s/2 \rfloor$), such as $c_{init}=\lfloor n_s/2 \rfloor \cdot 2^9 + N_{ID}^{cell}$, the scrambling sequences generated by UE for all subframes will be different, namely, $S1\sim S9$ may be different for each subframe, and initial value generated by the scrambling sequence needs to be updated in each subframe. Each scrambling value in the scrambling sequence with length of 9 corresponds to a SC-FDMA symbol used for data transmission in this subframe, and 12 modulation symbols in each SC-FDMA symbol are multiplied by the same scrambling value and then are sent after DFT precoding and IFFT. The details are shown in FIG. 5B.

(5) In case of adopting method 5: UE generates a scrambling sequence with length of $K_0=SF_0=5$ for the first slot and a scrambling sequence with length of $K_1=SF_1=4$ for the second slot; if the definition of initialization parameter generated by the scrambling sequence only relates to cell ID ($N_{ID}^{cell}$), such as $c_{init}=N_{ID}^{cell}$, initialization values of the scrambling sequences generated by UE for all slots will be the same and only the length of the intercepted scrambling sequence is different, namely, S1~S4 and S6~S9 are the same; if the definition of initialization parameter generated by the scrambling sequence relates to cell ID ($N_{ID}^{cell}$) and the index of slot ($n_s$), such as $c_{init}=n_s \cdot 2^9+N_{ID}^{cell}$, the scrambling sequences generated by UE for all slots will be different, namely, S1~S4 and S6~S9 may be different, and initial value generated by the scrambling sequence needs to be updated in each slot. For each subframe, each scrambling value in the scrambling sequence with length of 5 corresponds to a SC-FDMA symbol used for data transmission in the first slot, each scrambling value in the scrambling sequence with length of 4 corresponds to a SC-FDMA symbol used for data transmission in the second slot, and 12 modulation symbols in each SC-FDMA symbol are multiplied by the same scrambling value and then are sent after DFT precoding and IFFT. The details are shown in FIG. 5B.

(6) In case of adopting method 6: UE generates a scrambling sequence with length of $K_j=1$ for each SC-FDMA symbol; if the definition of initialization parameter generated by the scrambling sequence only relates to cell ID ($N_{ID}^{cell}$), such as $c_{init}=N_{ID}^{cell}$, the scrambling sequences generated by UE for all SC-FDMA symbols will be the same, namely, the values in S1 to S9 are the same; if the definition of initialization parameter generated by the scrambling sequence relates to cell ID ($N_{ID}^{cell}$) and SC-FDMA symbol number (l), such as $c_{init}=2^{10} \cdot (7 \cdot (n_s+1)+l+1) \cdot (2N_{ID}^{cell}+1)+2 \cdot N_{ID}^{cell}$, the scrambling sequences generated by UE for all SC-FDMA will be different, namely, the values in S1 to S9 may be different, and initial value generated by the scrambling sequence needs to be updated in each SC-FDMA symbol used for data transmission. For each subframe or each slot in each subframe, based on the generated scrambling sequence, UE will scramble by multiplying 12 modulation symbols in a SC-FDMA symbol used for data transmission and a corresponding scrambling value and then send them after DFT precoding and IFFT. The details are shown in FIG. 5B.

Furthermore, UE transmits the scrambled modulation symbol sequence using PUCCH format 3 transmission program.

Base Station Side:

It receives data through PUCCH format 3 transmission program, generates a descrambling sequence by adopting one of methods 1 to 6 the same as UE side and descrambles the received data through the generated descrambling sequence. To be specific:

(1) In case of adopting method 1: the base station generates a descrambling sequence with length of $$K_j = \sum_{i=0}^{S-1} N_{sc}^{PUCCH} \cdot SF_i = 12 \cdot 5 + 12 \cdot 4 = 108$$

for each subframe; if the definition of initialization parameter generated by the descrambling sequence only relates to cell ID ($N_{ID}^{cell}$), such as $c_{init}=N_{ID}^{cell}$, the descrambling sequences generated by the base station for all subframes will be the same; if the definition of initialization parameter generated by the descrambling sequence relates to cell ID ($N_{ID}^{cell}$) and the index of subframe ($\lfloor n_s/2 \rfloor$), such as $c_{init}=\lfloor n_s/2 \rfloor \cdot 2^9+N_{ID}^{cell}$, the descrambling sequences generated by the base station for all subframes will be different, and initial value generated by the descrambling sequence needs to be updated in each subframe. For each subframe, based on the generated descrambling sequence, UE will descramble through point-by-point operation of 108 modulation symbols in 9 SC-FDMA symbols used for data transmission in a subframe and the descrambling sequence with length of 120.

(2) In case of adopting method 2: the base station generates a descrambling sequence with length of $K_0=N_{sc}^{PUCCH} \cdot SF_0=12 \cdot 5=60$ for the first slot and a descrambling sequence with length of $K_1=N_{sc}^{PUCCH} \cdot SF_1=12 \cdot 4=48$ for the second slot; if the definition of initialization parameter generated by the descrambling sequence only relates to cell ID ($N_{ID}^{cell}$), such as $c_{init}=N_{ID}^{cell}$, initialization values of the descrambling sequences generated by the base station for all slots will be the same and only the length of the intercepted descrambling sequence is different; if the definition of initialization parameter generated by the descrambling sequence relates to cell ID ($N_{ID}^{cell}$) and the index of slot ($n_s$), such as $c_{init}=n_s \cdot 2^9+N_{ID}^{cell}$, the scrambling sequences generated by the base station for all slots will be different, and initial value generated by the descrambling sequence needs to be updated in each slot. For each subframe, based on the generated descrambling sequence, the base station will descramble through point-by-point operation of 60 modulation symbols in 5 SC-FDMA symbols used for data transmission in the first slot and the descrambling sequence with length of 60, and descramble through point-by-point operation of 48 modulation symbols in 4 SC-FDMA symbols used for data transmission in the second slot and the descrambling sequence with length of 48.

(3) In case of adopting method 3: the base station generates a descrambling sequence with length of $K_j=N_{sc}^{PUCCH}=12$ for each SC-FDMA symbol; if the definition of initialization parameter generated by the descrambling sequence only relates to cell ID ($N_{ID}^{cell}$), such as $c_{init}=N_{ID}^{cell}$, the descrambling sequences generated by the base station for all SC-FDMA symbols will be the same; if the definition of initialization parameter generated by the descrambling sequence relates to cell ID ($N_{ID}^{cell}$) and SC-FDMA symbol number (l), such as $c_{init}=2^{10} \cdot (7 \cdot (n_s+1)+l+1) \cdot (2N_{ID}^{cell}+1)+2 \cdot N_{ID}^{cell}$, the descrambling sequences generated by the base station for all SC-FDMA will be different, and initial value generated by the descrambling sequence needs to be updated in each SC-FDMA symbol used for data transmission. For each SC-FDMA symbol, based on the generated descrambling sequence, the base station will descramble through point-by-point operation of 12 modulation symbols in a SC-FDMA symbol used for data transmission and the scrambling sequence with length of 12.

(4) In case of adopting method 4: the base station generates a descrambling sequence with length of $$K_j = \sum_{i=0}^{S-1} SF_i = 5 + 4 = 9$$

for each subframe; if the definition of initialization parameter generated by the descrambling sequence only relates to cell ID ($N_{ID}^{cell}$), such as $c_{init}=N_{ID}^{cell}$, the descrambling sequences generated by the base station for all subframes will be the same; if the definition of initialization parameter generated by the descrambling sequence relates to cell ID ($N_{ID}^{cell}$) and the index of subframe ($\lfloor n_s/2 \rfloor$), such as $c_{init}=\lfloor n_s/2 \rfloor \cdot 2^9+N_{ID}^{cell}$, the descrambling sequences generated by the base station for all subframes will be different, and initial value generated by the descrambling sequence needs to be updated in each subframe. Each descrambling value in the descrambling sequence with length of 9 corresponds to a SC-FDMA symbol used for data transmission in this subframe, and 12 modulation symbols in each SC-FDMA symbol uses the same descrambling value.
(5) In case of adopting method 5: the base station generates a descrambling sequence with length of $K_0=SF_0=5$ for the first slot and a descrambling sequence with length of $K_1=SF_1=4$ for the second slot; if the definition of initialization parameter generated by the descrambling sequence only relates to cell ID ($N_{ID}^{cell}$), such as $c_{init}=N_{ID}^{cell}$, initialization values of the descrambling sequences generated by the base station for all slots will be the same and only the length of the intercepted descrambling sequence is different; if the definition of initialization parameter generated by the descrambling sequence relates to cell ID ($N_{ID}^{cell}$) and the index of slot ($n_s$), such as $c_{init}=n_s \cdot 2^9+N_{ID}^{cell}$, the descrambling sequences generated by the base station for all slots will be different, and initial value generated by the descrambling sequence needs to be updated in each slot. For each subframe, each descrambling value in the descrambling sequence with length of 5 corresponds to a SC-FDMA symbol used for data transmission in the first slot, each descrambling value in the descrambling sequence with length of 4 corresponds to a SC-FDMA symbol used for data transmission in the second slot, and 12 modulation symbols in each SC-FDMA symbol uses the same descrambling value.
(6) In case of adopting method 6: the base station generates a descrambling sequence with length of $K_j=1$ for each SC-FDMA symbol; if the definition of initialization parameter generated by the descrambling sequence only relates to cell ID ($N_{ID}^{cell}$), such as $c_{init}=N_{ID}^{cell}$, the descrambling sequences generated by the base station for all SC-FDMA symbols will be the same; if the definition of initialization parameter generated by the descrambling sequence relates to cell ID ($N_{ID}^{cell}$) and SC-FDMA symbol number (l), such as $c_{init}=2^{10} \cdot (7 \cdot (n_s+1)+l+1) \cdot (2N_{ID}^{cell}+1)+2 \cdot N_{ID}^{cell}$, the descrambling sequences generated by the base station for all SC-FDMA will be different, and initial value generated by the descrambling sequence needs to be updated in each SC-FDMA symbol used for data transmission. For each subframe or each slot in each subframe, based on the generated descrambling sequence, the base station will descramble through operation of 12 modulation symbols in a SC-FDMA symbol used for data transmission and a corresponding descrambling value.

It should be noted that the embodiments take ACK/NACK transmission for example so as to simplify description, and the embodiments of the present invention are also application the process of transmitting other message through PUCCH format 3. It should be noted that the embodiments take QPSK modulation method for example to describe generation of a scrambling sequence through pseudo-random sequence modulation, which is also applicable to the process of generating a scrambling sequences through pseudo-random sequence by using other modulation methods. Based on the same technical consideration, the embodiments of the present invention also provide a kind of UE and a kind of base station that can be applied in the aforementioned process.

Figure 6:
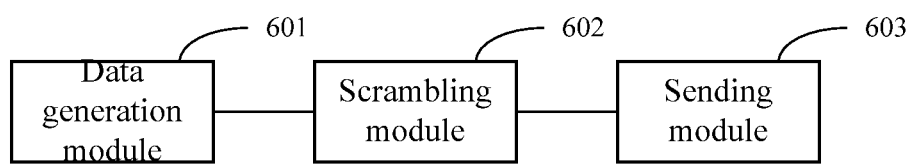
FIG. 6 is a structural diagram of user terminal provided in embodiments of the present invention.

As shown in FIG. 6, user terminal provided in the embodiments of the present invention comprises:
Data generation module 601, used for generating a message to be sent and modulate the message to be sent to generate a data modulation symbol;
Scrambling module 602, used for scrambling the data modulation symbol using the cell-specific scrambling sequence, to generate the scrambled data modulation symbols;
Sending module 603, used for sending the scrambled data modulation symbols via a DFT-S-OFDM transmission structure with a time domain spreading.

Scrambling module 602 among the aforementioned user terminals can generate a scrambling sequence based on the amount of data modulation symbols in a subframe (including all data modulation symbols on a time domain and a frequency domain), and use the scrambling sequence to scramble data modulation symbols in the subframe. Therein, each scrambling value in the scrambling sequence respectively corresponds to a corresponding data modulation symbol in the subframe.

To be specific, scrambling module 603 can adopt the aforementioned method 1, that is, it generates scrambling sequence $c_j(n)$ with length of $$K_j = \sum_{i=0}^{S-1} N_{sc}^{PUCCH} \cdot SF_i$$

for each subframe based on the total number of data modulation symbols in each subframe, and scrambles data modulation symbols in subframe j as below: $\tilde{d}_j(n)=d_j(n) \cdot c_j(n)$; wherein, S refers to the total number of slots in a subframe, $N_{sc}^{PUCCH}$ refers to the total number of subcarriers in a PUCCH SC-FDMA symbol, $SF_i$ refers to the total number of SC-FDMA symbols used for data transmission in the $i^{th}$ slot in a subframe and $d_j(n)$ refers to the sequence of data modulation symbols transmitted in subframe j; i=0, ..., S−1 refers to slot index in a subframe; j refers to the index of subframe; n=0, 1, ... $K_j$−1. Furthermore, scrambling module 603 can generate the scrambling sequence $c_j(n)$ at least according to cell ID ($N_{ID}^{cell}$) or at least according to cell ID and the index of subframe ($\lfloor n_s/2 \rfloor$).

Scrambling module 603 also can adopt the aforementioned method 2, that is, it generates scrambling sequence $c_i(n)$ with length of $K_i=N_{sc}^{PUCCH} \cdot SF_i$ for each slot based on the total number of data modulation symbols in each slot i in a subframe; and then scrambles data modulation symbols in slot i in a subframe as below: $\tilde{d}_i(n)=d_i(n) \cdot c_i(n)$; wherein, $N_{sc}^{PUCCH}$ refers to the total number of subcarriers in a PUCCH SC-FDMA symbol, $SF_i$ refers to the total number of SC-FDMA symbols used for data transmission in the $i^{th}$ slot in a subframe and $d_i(n)$ refers to the sequence of data modulation symbols transmitted in slot i in a subframe; i=0, ... S−1 refers to slot index; n=0, 1, ... $K_i$−1. Furthermore, scrambling module 603 can generate the scrambling sequence $c_i(n)$ at least according to cell ID ($N_{ID}^{cell}$) or at least according to cell ID and the index of slot ($n_s$). Scrambling module 603 also can adopt the aforementioned method 3, that is, it generates scrambling sequence $c_l(n)$ with length of $K_l=N_{sc}^{PUCCH}$ for each SC-FDMA symbol used for data transmission based on the total number of data modulation symbols in each SC-FDMA symbol in a subframe, and scrambles data modulation symbols in SC-FDMA symbol l used for data transmission as below: $\tilde{d}_l(n)=d_l(n) \cdot c_l(n)$; wherein, $N_{sc}^{PUCCH}$ refers to the total number of subcarriers in a PUCCH SC-FDMA symbol and $d_l(n)$ refers to the sequence of data modulation symbols in the SC-FDMA symbol; n=0, 1, ... $K_l$−1; l=0, 1, ... $N_{symb}^{UL}$−1, refers to the index of SC-FDMA symbol in a slot. Furthermore, scrambling module 603 can generate the scrambling sequence $c_l(n)$ at least according to cell ID ($N_{ID}^{cell}$) or at least according to cell ID and SC-FDMA symbol number (l).

Scrambling module 603 among the aforementioned user terminals can generate a scrambling sequence based on the amount of SC-FDMA symbols in a subframe, and use the scrambling sequence to scramble data modulation symbols in the subframe. Therein, each scrambling value in the scrambling sequence respectively corresponds to a corresponding SC-FDMA symbol in the subframe.

To be specific, scrambling module 603 can adopt the aforementioned method 4, that is, it generates scrambling sequence $c_j(m)$ with length of $$K_j = \sum_{i=0}^{S-1} SF_i$$

for each subframe based on the total number of SC-FDMA symbols in each subframe, and scrambles modulation symbols in subframe j as below: $\tilde{d}_j(m \cdot N_{sc}^{PUCCH}+n)=c_j(m) \cdot d_j(m \cdot N_{sc}^{PUCCH}+n)$; wherein, S refers to the total number of slots in a subframe, $SF_i$ refers to the total number of SC-FDMA symbols used for data transmission in the $i^{th}$ slot in a subframe and $d_j(\bullet)$ refers to the sequence of data modulation symbols transmitted in subframe j; $i=0, \ldots S-1$ refers to slot index in a subframe and j refers to the index of subframe; $m=0, \ldots, K_j-1$, and $n=0, 1, \ldots N_{sc}^{PUCCH}-1$. Furthermore, scrambling module 603 can generate the scrambling sequence $c_j(m)$ at least according to cell ID ($N_{ID}^{cell}$) or at least according to cell ID and the index of subframe ($\lfloor n_s/2 \rfloor$).

Scrambling module 603 also can adopt the aforementioned method 5, that is, it generates scrambling sequence $c_i(m)$ with length of $K_i=SF_i$ for each slot based on the total number of SC-FDMA symbols in each slot, and scrambles data modulation symbols in slot i in a subframe as below: $\tilde{d}_i(m \cdot N_{sc}^{PUCCH}+n)=c_i(m) \cdot d_i(m \cdot N_{sc}^{PUCCH}+n)$; wherein, S refers to the total number of slots in a subframe, $SF_i$ refers to the total number of SC-FDMA symbols used for data transmission in the $i^{th}$ slot in a subframe and $d_i(\bullet)$ refers to the sequence of data modulation symbols in slot i in a subframe; $i=0, \ldots S-1$ refers to slot index in a subframe, $m=0, \ldots, K_i-1$ and $n=0, 1, \ldots N_{sc}^{PUCCH}-1$. Furthermore, scrambling module 603 can generate the scrambling sequence $c_i(m)$ at least according to cell ID ($N_{ID}^{cell}$) or at least according to cell ID and the index of slot ($n_s$).

Scrambling module 603 also can adopt the aforementioned method 6, that is, it generates scrambling sequence $c_l$ with length of $K_l=1$ for each SC-FDMA symbol used for data transmission and scramble data modulation symbols in SC-FDMA symbol l used for data transmission as below: $\tilde{d}_l(n) = c_l \cdot d_l(n)$; wherein, l refers to the index of SC-FDMA symbol used for data transmission in a slot, $n=0, 1, \ldots N_{sc}^{PUCCH}-1$ and $d_l(n)$ refers to the sequence of data modulation symbols in SC-FDMA symbol l used for data transmission. Furthermore, scrambling module 603 can generate the scrambling sequence $c_l$ at least according to cell ID ($N_{ID}^{cell}$) or at least according to cell ID and SC-FDMA symbol number (l).

Scrambling module 603 among the aforementioned user terminals can generate the cell-specific scrambling sequence of a cell at least according to cell ID ($N_{ID}^{cell}$). To be specific, scrambling module 603 can generate the cell-specific scrambling sequence of a cell according to cell ID and one of the following parameters or according to the cell ID and any combination of the following parameters:

Index of radio frame ($n_f$);
Index of slot in a radio frame ($n_s$);
Index of subframe in a radio frame ($\lfloor n_s \rfloor$);
Index of SC-FDMA symbol in a slot (l).

To be specific, scrambling module 603 can generate the cell-specific scrambling sequence of a cell via the following methods:

Firstly generate a pseudo-random sequence:

$c(n)=(x_1(n+N_C)+x_2(n+N_C)) \bmod 2$ $x_1(n+31)=(x_1(n+3)+x_1(n)) \bmod 2$ $x_2(n+31)=(x_2(n+3)+x_2(n+2)+x_2(n+1)+x_2(n)) \bmod 2$ Wherein, $N_c=1600$, initialization parameter of the first m sequence $x_1(n)$ is $x_1(0)=1$, $x_1(n)=0$, $n=1, 2, \ldots, 30$; definition form of initialization parameter of the second m sequence $x_2(n)$ is $c_{init}=\sum_{i=0}^{30} x_2(i) \cdot 2^i$, $c_{init}$ is obtained the following methods:

$c_{init} = N_{ID}^{cell}$; or, $c_{init} = \lfloor n_s/2 \rfloor \cdot 2^9 + N_{ID}^{cell}$; or, $c_{init} = n_s \cdot 2^9 + N_{ID}^{cell}$; or, $c_{init} = (\lfloor n_s/2 \rfloor + 1) \cdot (2N_{ID}^{cell}+1) \cdot 2^9 + N_{ID}^{cell}$; or, $c_{init} = 2^{10} \cdot (7 \cdot (n_s+1) + l + 1) \cdot (2N_{ID}^{cell}+1) + 2 \cdot N_{ID}^{cell}$; or, $c_{init} = 2^{10} \cdot (7 \cdot (n_s+1) + l + 1) \cdot (2N_{ID}^{cell}+1) + 2 \cdot N_{ID}^{cell} + N_{CP}$, wherein, $$N_{CP} = \begin{cases} 1, & \text{normal } CP \\ 0, & \text{extended } CP \end{cases}$$

The scrambling sequence can be obtained further through deformation or expansion of pseudo-random sequence generated via the aforementioned method. For example, 0 element in the generated pseudo-random sequence is replaced with −1 or $e^{\pm j\pi/2}$ to obtain the scrambling sequence; or, the scrambling sequence can be obtained through corresponding x-QAM modulation by taking every k (the amount) elements in the generated pseudo-random sequence as a group; for example, every 1 element in the pseudo-random sequence is taken as a group for BPSK modulation; or every 2 elements in the pseudo-random sequence is taken as a group for QPSK modulation; or every 4 elements in the pseudo-random sequence is taken as a group for 16QAM modulation; or every 6 elements in the pseudo-random sequence is taken as a group for 64QAM modulation.

Figure 7:
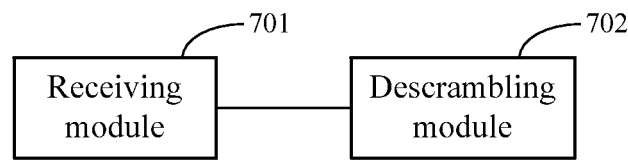
FIG. 7 is a structural diagram of base station provided in embodiments of the present invention.

FIG. 7 is a structural diagram of base station provided in the embodiments of the present invention. As shown in the figure, this base station can comprise:

Receiving module 701, used for receiving data modulation symbol via by utilizing a DFT-S-OFDM transmission structure with a time domain despreading, and this symbol is sent by a user terminal;

Descrambling module 702, used for descrambling the received data modulation symbol using the cell-specific descrambling sequence of a cell.

Descrambling module 702 among the aforementioned base stations can generate a descrambling sequence based on the amount of data modulation symbols in a subframe and use the descrambling sequence to descramble data modulation symbols in the subframe. Therein, each descrambling value in the descrambling sequence respectively corresponds to a corresponding data modulation symbol in the subframe.

To be specific, descrambling module 702 can generate descrambling sequence $c_j(n)$ with length of $$K_j = \sum_{i=0}^{S-1} N_{sc}^{PUCCH} \cdot SF_i$$

for each subframe based on the total number of data modulation symbols in each subframe, and descrambling data modulation symbols in subframe j; or, It generates descrambling sequence $c_i(n)$ with length of $K_i = N_{sc}^{PUCCH} \cdot SF_i$ for each slot based on the total number of data modulation symbols in each slot in a subframe, and descrambles data modulation symbols in slot i in a subframe; or, It generates descrambling sequence $c_j(n)$ with length of $K_j = N_{sc}^{PUCCH}$ for each SC-FDMA symbol used for data transmission based on the total number of data modulation symbols in each SC-FDMA symbol used for data transmission in a subframe, and descrambles data modulation symbols in SC-FDMA symbol l used for data transmission.

Descrambling module 702 among the aforementioned base stations can generate a descrambling sequence based on the amount of SC-FDMA symbols used for data transmission in a subframe and use the descrambling sequence to descramble data modulation symbols in the subframe. Therein, each descrambling value in the descrambling sequence respectively corresponds to a corresponding SC-FDMA symbol used for data transmission in the subframe.

To be specific, descrambling module 702 can generate descrambling sequence $c_j(m)$ with length of $$K_j = \sum_{i=0}^{S-1} SF_i$$

for each subframe based on the total number of SC-FDMA symbols used for data transmission in each subframe, and descramble data modulation symbols in subframe j; or, Based on the amount of SC-FDMA symbols used for data transmission in each slot, it generates descrambling sequence $c_i(m)$ with length of $K_i = SF_i$ for each slot to descramble data modulation symbols in slot i in a subframe; or, It generates descrambling sequence $c_j$ with length of $K_j = 1$ for each SC-FDMA symbol used for data transmission to descramble data modulation symbols in SC-FDMA symbol l used for data transmission.

Descrambling module 702 among the aforementioned base stations can generate the cell-specific descrambling sequence of a cell according to cell ID ($N_{ID}^{cell}$) or generate the cell-specific descrambling sequence of a cell according to cell ID and one of the following parameters or according to the cell ID and any combination of the following parameters:
  Index of radio frame ($n_f$);
  Index of slot in a radio frame ($n_s$);
  Index of subframe in a radio frame ($\lfloor n_s \rfloor$);
  Index of SC-FDMA symbol in a slot (l).

To be specific, descrambling module 702 can generate the descrambling sequence based on a pseudo-random sequence; the pseudo-random sequence is generated at least according to cell ID ($N_{ID}^{cell}$) or according to one of index of radio frame ($n_f$), index of slot ($n_s$) in a radio frame, index of subframe ($\lfloor n_s \rfloor$) in a radio frame, and index of SC-FDMA symbol (l) in a slot or any combination thereof. Furthermore, after generating a pseudo-random sequence, descrambling module 702 can replace specific elements in the pseudo-random sequence with set values to generate a descrambling sequence, or take every k elements in the pseudo-random sequence as a group and enable QAM modulation for each group of the elements to generate a descrambling sequence, therein, $k \geq 1$.

To sum up, the embodiments of the present invention give the method of introducing cell-specific scrambling operation in LTE-A system through PUCCH format 3 to lower mutual interference between adjacent cells, thus improving the detection performance of uplink control signals.

Through the description of the embodiments above, the technical personnel in this field can understand clearly that the present invention can be implemented by software and necessary general hardware platform or hardware (the former is better in most cases). Based on this understanding, the technical program or the part making contributions to the prior art of the present invention can be embodied by a form of software products essentially which can be stored in a storage medium, including a number of instructions for making a terminal device (such as cellphones, personal computers, servers, or network equipment, etc.) implement the methods described in the embodiments of the present invention.

The description above only involves the preferential embodiments of the present invention. It should be indicated that common technical personnel in this technical field can make certain improvements and modifications on the premise of not departing from the invention principle and such improvements and modifications also will be as the protection scope of the present invention.

The invention claimed is:

1. A scrambling transmission method, wherein, comprising:
    a user terminal generating a message to be sent and modulating the message to be sent to generate a plurality of data modulation symbols;
    wherein the user terminal scrambling the data modulation symbols uses a cell-specific scrambling sequence, to generate the scrambled data modulation symbols;
    wherein the user terminal sending the scrambled data modulation symbols send these symbols via a discrete Fourier transformation spread orthogonal frequency division multiplexing DFT-S-OFDM (Discrete Fourier Spread Optical Orthogonal Frequency Division Multiplexing) transmission structure with a time domain spreading.

2. The method according to claim 1, wherein, the user terminal scrambling the data modulation symbols using the cell-specific scrambling sequence performs the following steps:
    performing method 1 comprising generating the cell-specific scrambling sequence based on the amount of data modulation symbols in a subframe and using the cell-specific scrambling sequence to scramble the data modulation symbols in the subframe; therein, each scrambling value in the cell-specific scrambling sequence respectively corresponds to a corresponding data modulation symbol in the subframe; or,
    performing method 2 comprising generating the cell-specific scrambling sequence based on the amount of SC-FDMA (Single Carrier Frequency Division Multiple Access) symbols used for data transmission in the subframe and using the cell-specific scrambling sequence to scramble the data modulation symbols in the subframe; therein, each scrambling value in the cell-specific scrambling sequence respectively corresponds to a corresponding SC-FDMA symbol used for data transmission in the subframe.

3. The method according to claim 2, wherein, method 1 comprises the following steps:
    generating the cell-specific scrambling sequence $c_j(n)$ with a length of $$K_j = \sum_{i=0}^{S-1} N_{sc}^{PUCCH} \cdot SF_i$$

for each subframe based on the total number of the data modulation symbols in each subframe, and scrambling the data modulation symbols in subframe j as below:

$$\tilde{d}_j(n) = d_j(n) \cdot c_j(n)$$

wherein,
    S refers to the total number of slots in a subframe,
    $N_{sc}^{PUCCH}$ refers to the total number of subcarriers in a PUCCH (Physical Uplink Control Channel) SC-FDMA symbol, SF$_i$ refers to the total number of SC-FDMA symbols used for data transmission in the i$^{th}$ slot in a subframe and d$_j$(n) refers to the sequence of data modulation symbols transmitted in subframe j;

i=0, . . . S−1 refers to the index of slot in a subframe;

j refers to the index of subframe; n=0, 1, . . . K$_j$−1; or, generating the cell-specific scrambling sequence c$_i$(n) with a length of K$_i$=N$_{sc}^{PUCCH}$·SF$_i$ for each slot based on the total number of the data modulation symbols in each slot in a subframe, and scrambling the data modulation symbols in slot i in a subframe as below:

$$\tilde{d}_i(n)=d_i(n)\cdot c_i(n)$$

wherein,

N$_{sc}^{PUCCH}$ refers to the total number of subcarriers in a PUCCH SC-FDMA symbol, SF$_i$ refers to the total number of SC-FDMA symbols used for data transmission in the i$^{th}$ slot in a subframe and d$_i$(n) refers to the sequence of data modulation symbols transmitted in slot i in a subframe;

i=0, . . . S−1 refers to the index of slot in a subframe;

n=0, 1, . . . K$_i$−1; or, generating the cell-specific scrambling sequence c$_l$(n) with a length of K$_l$=N$_{sc}^{PUCCH}$ for each SC-FDMA symbol used for data transmission based on the total number of the data modulation symbols in each SC-FDMA symbol used for data transmission in a subframe, and scrambling the data modulation symbols in SC-FDMA symbol l used for data transmission as below:

$$\tilde{d}_l(n)=d_l(n)\cdot c_l(n)$$

wherein,

N$_{sc}^{PUCCH}$ refers to the total number of subcarriers in a PUCCH SC-FDMA symbol and d$_l$(n) refers to the sequence of data modulation symbols in the SC-FDMA symbol l;

n=0, 1, . . . K$_l$−1;

l refers to the index of SC-FDMA symbol used for data transmission in a slot.

4. The method according to claim 2, wherein, method 2, comprises the following steps:

generating the cell-specific scrambling sequence c$_j$(m) with a length of $$K_j = \sum_{i=0}^{S-1} SF_i$$

for each subframe based on the total number of the SC-FDMA symbols used for data transmission in each subframe, and scrambling the data modulation symbols in subframe j as below:

$$\tilde{d}_j(m\cdot N_{sc}^{PUCCH}+n)=c_j(m)\cdot d_j(m\cdot N_{sc}^{PUCCH}+n)$$

wherein, S refers to the total number of slots in a subframe,

SF$_i$ refers to the total number of SC-FDMA symbols used for data transmission in the i$^{th}$ slot in a subframe and d$_j$(•) refers to the sequence of data modulation symbols in subframe j;

i=0, . . . S−1 refers to the index of slot in a subframe and j refers to the index of subframe;

m=0, . . . , K$_j$−1 and n=0, 1, . . . N$_{sc}^{PUCCH}$−1; or, generating the cell-specific scrambling sequence c$_i$(m) with a length of K$_i$=SF$_i$ for each slot based on the total number of the SC-FDMA symbols used for data transmission in each slot, and scrambling the data modulation symbols in slot i in a subframe as below:

$$\tilde{d}_i(m\cdot N_{sc}^{PUCCH}+n)=c_i(m)\cdot d_i(m\cdot N_{sc}^{PUCCH}+n)$$

wherein,

S refers to the total number of slots in a subframe,

SF$_i$ refers to the total number of SC-FDMA symbols used for data transmission in the i$^{th}$ slot in a subframe and d$_i$(•) refers to the sequence of data modulation symbols in slot i in a subframe;

i=0, . . . S−1 refers to the index of slot in a subframe, m=0, . . . , K$_i$−1 and n=0, 1, . . . N$_{sc}^{PUCCH}$−1; or generating the cell-specific scrambling sequence c$_l$ with a length of K$_l$=1 for each SC-FDMA symbol used for data transmission, and scrambling the data modulation symbols in SC-FDMA symbol l used for data transmission as below:

$$\tilde{d}_l(n)=c_l\cdot d_l(n)$$

wherein, l refers to the index of SC-FDMA symbol used for data transmission in a slot, n=0, 1, . . . N$_{sc}^{PUCCH}$−1, and d$_l$(n) refers to the sequence of data modulation symbols in SC-FDMA symbol l used for data transmission.

5. The method according to claim 1, wherein, the cell-specific scrambling sequence is generated at least according to the cell ID or according to the cell ID and one of the following parameters or according to the cell ID and any combination of the following parameters:

index of radio frame;

index of slot in a radio frame;

index of subframe in a radio frame;

index of SC-FDMA symbol in a slot.

6. The method according to claim 1, wherein, the cell-specific scrambling sequence is generated based on a pseudo-random sequence; the cell-specific scrambling sequence is generated at least according to the cell ID or according to the cell ID and one of the following parameters or according to the cell ID and any combination of the following parameters: the index of radio frame, the index of slot in a radio frame, the index of subframe in a radio frame, and the index of SC-FDMA symbol in a slot.

7. The method according to claim 6, wherein, the cell-specific scrambling sequence is generated based on a pseudo-random sequence, performs the following steps:

replacing specific elements in the pseudo-random sequence with set values, or taking every k elements in the pseudo-random sequence as a group and modulating each group with QAM modulation, therein, k≥1.

8. A user terminal, wherein, comprising:

a data generation module, used for generating a message to be sent and modulating the message to be sent to generate a plurality of data modulation symbols;

a scrambling module, used for scrambling the data modulation symbols using a cell-specific scrambling sequence, to generate the scrambled data modulation symbols;

a sending module, used for sending the scrambled data modulation symbols via a DFT-S-OFDM (Discrete Fourier Transform Spread Optical Orthogonal Frequency Division Multiplexing) transmission structure with a time domain spreading.

9. The user terminal according to claim 8, wherein, the scrambling module performs the following steps:
   performing method 1, comprising generating the cell-specific scrambling sequence based on the amount of data modulation symbols in a subframe and using the cell-specific scrambling sequence to scramble the data modulation symbols in the subframe; therein, each scrambling value in the cell-specific scrambling sequence respectively corresponds to a corresponding data modulation symbol in the subframe; or,
   performing method 2, comprising generating the cell-specific scrambling sequence based on the amount of SC-FDMA (Single Carrier Frequency Division Multiple Access) symbols used for data transmission in a subframe and using the cell-specific scrambling sequence to scramble the data modulation symbols in the subframe; therein, each scrambling value in the cell-specific scrambling sequence respectively corresponds to a corresponding SC-FDMA symbol used for data transmission.

10. The user terminal according to claim 9, wherein, for the method 1, the scrambling module performs the following steps:
   generating the cell-specific scrambling sequence $c_j(n)$ with a length of $$K_j = \sum_{i=0}^{S-1} N_{sc}^{PUCCH} \cdot SF_i$$

for each subframe based on the total number of the data modulation symbols in each subframe, and scrambling the data modulation symbols in subframe j as below:

$$\tilde{d}_j(n) = d_j(n) \cdot c_j(n)$$

wherein, S refers to the total number of slots in a subframe, $N_{sc}^{PUCCH}$ refers to the total number of subcarriers in a PUCCH SC-FDMA symbol,
   $SF_i$ refers to the total number of SC-FDMA symbols used for data transmission in the $i^{th}$ slot in a subframe and
   $d_j(n)$ refers to the sequence of data modulation symbols transmitted in subframe; j;
   i=0, . . . S−1 refers to the index of slot in a subframe;
   j refers to the index of subframe;
   n=0, 1, . . . $K_j$−1; or,
   generating the cell-specific scrambling sequence $c_i(n)$ with a length of $K_i = N_{sc}^{PUCCH} \cdot SF_i$ for each slot based on the total number of the data modulation symbols in each slot in a subframe, and scrambling the data modulation symbols in slot i in a subframe as below:

$$\tilde{d}_i(n) = d_i(n) \cdot c_i(n)$$

wherein, $N_{sc}^{PUCCH}$ refers to the total number of subcarriers in a PUCCH SC-FDMA symbol,
   $SF_i$ refers to the total number of SC-FDMA symbols used for data transmission in the $i^{th}$ slot in a subframe and
   $d_i(n)$ refers to the sequence of data modulation symbols transmitted in slot i in a subframe;
   i=0, . . . S−1 refers to the index of slot in a subframe;
   n=0, 1, . . . $K_i$−1; or,
generating the cell-specific scrambling sequence $c_l(n)$ with a length of $K_l = N_{sc}^{PUCCH}$ for each SC-FDMA symbol used for data transmission based on the total number of the data modulation symbols in each SC-FDMA symbol used for data transmission in a subframe, and scrambling the data modulation symbols in SC-FDMA symbol l used for data transmission as below:

$$\tilde{d}_l(n) = d_l(n) \cdot c_l(n)$$

wherein, $N_{sc}^{PUCCH}$ refers to the total number of subcarriers in a PUCCH SC-FDMA symbol and
   $d_l(n)$ refers to the sequence of data modulation symbols in the SC-FDMA symbol l;
   n=0, 1, . . . $K_l$−1; l refers to the index of SC-FDMA symbol used for data transmission in a slot;
   wherein with method 2, the scrambling module is specifically used for:
   generating the cell-specific scrambling sequence $c_j(m)$ with a length of $$K_j = \sum_{i=0}^{S-1} SF_i$$

for each subframe based on the total number of the SC-FDMA symbols used for data transmission in each subframe, and scrambling the data modulation symbols in subframe j as below:

$$\tilde{d}_j(m \cdot N_{sc}^{PUCCH} + n) = c_j(m) \cdot d_j(m \cdot N_{sc}^{PUCCH} + n)$$

wherein, S refers to the total number of slots in a subframe,
   $SF_i$ refers to the total number of SC-FDMA symbols used for data transmission in the $i^{th}$ slot in a subframe and
   $d_j(\bullet)$ refers to the sequence of data modulation symbols in subframe j;
   i=0, . . . S−1 refers to the index of slot in a subframe and j refers to the index of subframe;
   m=0, . . . , $K_j$−1; and
   n=0, 1, . . . $N_{sc}^{PUCCH}$−1; or,
   generating the cell-specific scrambling sequence $c_i(m)$ with a length of $K_i = SF_i$ for each slot based on the total number of the SC-FDMA symbols used for data transmission in each slot, and scrambling the data modulation symbols in slot i in a subframe as below:

$$\tilde{d}_i(m \cdot N_{sc}^{PUCCH} + n) = c_i(m) \cdot d_i(m \cdot N_{sc}^{PUCCH} + n)$$

wherein,
   S refers to the total number of slots in a subframe,
   $SF_i$ refers to the total number of SC-FDMA symbols used for data transmission in the $i^{th}$ slot in a subframe and
   $d_i(\bullet)$ refers to the sequence of data modulation symbols in slot i in a subframe;
   i=0, . . . S−1 refers to the index of slot in a subframe,
   m=0, . . . , $K_i$−1 and
   n=0, 1, . . . $N_{sc}^{PUCCH}$−1; or,
   generating the cell-specific scrambling sequence $c_l$ with a length of $K_l = 1$ for each SC-FDMA symbol used for data transmission, and scrambling the data modulation symbols in SC-FDMA symbol l used for data transmission as below:

$$\tilde{d}_l(n) = c_l \cdot d_l(n)$$

wherein, l refers to the index of SC-FDMA symbol used for data transmission in a slot,
   n=0, 1, . . . $N_{sc}^{PUCCH}$−1 and
   $d_l(n)$ refers to the sequence of data modulation symbol in SC-FDMA symbol l used for data transmission.

11. The user terminal according to claim 8, wherein, the scrambling module is specifically used for generating the cell-specific scrambling sequence according to the cell ID or generating the cell-specific scrambling sequence according to the cell ID and one of the following parameters or generating the cell-specific scrambling sequence according to the cell ID and any combination of the following parameters:
- index of radio frame;
- index of slot in a radio frame;
- index of subframe in a radio frame;
- index of SC-FDMA symbol in a slot.

12. The user terminal according to claim 8, wherein, the scrambling module is specifically used for generating the cell-specific scrambling sequence based on a pseudo-random sequence; the pseudo-random sequence is generated at least according to the cell ID or according to the cell ID and one of the following parameters or according to the cell ID and any combination of the following parameters: the index of radio frame, the index of slot in a radio frame, the index of subframe in a radio frame, and the index of SC-FDMA symbol in a slot.

13. The user terminal according to claim 12, wherein, the scrambling module is specifically used for replacing specific elements in the pseudo-random sequence with set values, or taking every k elements in the pseudo-random sequence as a group and modulating each group with QAM (Quadrature Amplitude Modulation) modulation, therein, k≥1.

14. A scrambling transmission method, comprising:
providing a base station receiving the data modulation symbols sent by a user terminal via a DFT-S-OFDM (Discrete Fourier Transform Spread Optical Orthogonal Frequency Division Multiplexing) transmission structure with a time domain despreading;
wherein the base station descrambling the received data modulation symbols uses a cell-specific descrambling sequence.

15. The method according to claim 14, wherein, the base station descrambling the received the data modulation symbols using a cell-specific descrambling sequence, performs at least one of the following steps:
performing method 1, comprising generating the cell-specific descrambling sequence based on the amount of data modulation symbols in a subframe and using the cell-specific descrambling sequence to descramble the data modulation symbols in the subframe; therein, each descrambling value in the cell-specific descrambling sequence respectively corresponds to a corresponding data modulation symbol in the subframe; or,
performing method 2, comprising generating the cell-specific descrambling sequence based on the amount of SC-FDMA (Single Carrier Frequency Division Multiple Access) symbols used for data transmission in a subframe and using the cell-specific descrambling sequence to descramble the data modulation symbols in the subframe; therein, each descrambling value in the cell-specific descrambling sequence respectively corresponds to a corresponding SC-FDMA symbol used for data transmission in the subframe.

16. The method according to claim 15, wherein, method 1, comprises the following steps:
generating the cell-specific descrambling sequence $c_j(n)$ with a length of $$K_j = \sum_{i=0}^{S-1} N_{sc}^{PUCCH} \cdot SF_i$$

for each subframe based on the total number of the data modulation symbols in each subframe, and descrambling the data modulation symbols in subframe j; or,
generating the cell-specific descrambling sequence $c_i(n)$ with a length of $K_i = N_{sc}^{PUCCH} \cdot SF_i$ for each slot based on the total number of the data modulation symbols in each slot in a subframe, and descrambling the data modulation symbols in slot i in a subframe; or,
generating the cell-specific descrambling sequence $c_l(n)$ with a length of $K_l = N_{sc}^{PUCCH}$ for each SC-FDMA symbol used for data transmission based on the total number of the data modulation symbols in each SC-FDMA symbol used for data transmission in a subframe, and descrambling the data modulation symbols in SC-FDMA l used for data transmission.

17. The method according to claim 15, wherein, method 2, comprises the following steps:
generating the cell-specific descrambling sequence $c_j(m)$ with a length of $$K_j = \sum_{i=0}^{S-1} SF_i$$

for each subframe based on the total number of the SC-FDMA symbols used for data transmission in each subframe, and descrambling the data modulation symbols in subframe j; or,
generating the cell-specific descrambling sequence $c_i(m)$ with a length of $K_i = SF_i$ for each slot based on the total number of the SC-FDMA symbols used for data transmission in each slot, and descrambling the data modulation symbols in slot i in a subframe; or,
generating the cell-specific descrambling sequence $c_l$ with a length of $K_l = 1$ for each SC-FDMA symbol used for data transmission, and descrambling the data modulation symbols in SC-FDMA symbol l used for data transmission.

18. The method according to claim 14, wherein, the cell-specific descrambling sequence is generated at least according to the cell ID or according to the cell ID and one of the following parameters or according to the cell ID and any combination of the following parameters:
- index of radio frame;
- index of slot in a radio frame;
- index of subframe in a radio frame;
- index of SC-FDMA symbol in a slot.

19. The method according to claim 14, wherein, the cell-specific descrambling sequence is generated based on a pseudo-random sequence; the pseudo-random sequence is generated at least according to the cell ID or according to one of the following parameters or according to the cell ID and any combination of the following parameters: the index of radio frame, the index of slot in a radio frame, the index of subframe in a radio frame and the index of SC-FDMA symbol in a slot.

20. The method according to claim 19, wherein, the cell-specific descrambling sequence is generated based on a pseudo-random sequence, comprises the following step:
replacing specific elements in the pseudo-random sequence with set values, or taking every k elements in the pseudo-random sequence as a group and modulating each group with QAM modulation, therein, k≥1.

* * * * *